United States Patent
Ryu et al.

(10) Patent No.: US 12,089,192 B2
(45) Date of Patent: Sep. 10, 2024

(54) CBR AND CR WITH MINI SLOTS

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/650,043

(22) Filed: Feb. 4, 2022

(65) Prior Publication Data

US 2023/0254827 A1    Aug. 10, 2023

(51) Int. Cl.
*H04W 72/0446*    (2023.01)
*H04W 24/08*    (2009.01)
*H04W 24/10*    (2009.01)

(52) U.S. Cl.
CPC ....... *H04W 72/0446* (2013.01); *H04W 24/08* (2013.01); *H04W 24/10* (2013.01)

(58) Field of Classification Search
None
See application file for complete search history.

(56) References Cited

U.S. PATENT DOCUMENTS

2023/0254069 A1 *  8/2023  Lee .............. H04L 1/0025
                                            370/252

FOREIGN PATENT DOCUMENTS

WO    WO-2019031926 A1 *  2/2019  .......... H04B 17/318
WO    WO-2022077523 A1 *  4/2022  ........ H04W 28/0284

* cited by examiner

*Primary Examiner* — Chi H Pham
*Assistant Examiner* — Raul Rivas
(74) *Attorney, Agent, or Firm* — Procopio, Cory, Hargreaves & Savitch LLP/QUALCOMM

(57) ABSTRACT

A first UE may calculate a CBR associated with a sidelink resource pool over a measurement window. A partially used slot-subchannel block in the plurality of slots may be associated with a non-zero contribution to the CBR. The partially used slot-subchannel block may include at least one used mini slot-subchannel block. The first UE may identify a CR limit associated with the sidelink resource pool based on the CBR. The first UE may select one or more resources associated with a slot from the sidelink resource pool for a sidelink transmission to a second UE based on the CR limit. The first UE may transmit, to the second UE, the sidelink transmission based on the selected one or more resources.

28 Claims, 18 Drawing Sheets

CBR AND CR WITH MINI SLOTS

TECHNICAL FIELD

The present disclosure relates generally to communication systems, and more particularly, to congestion control in sidelink communications involving mini slots in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE). The apparatus may calculate a channel busy ratio (CBR) associated with a sidelink resource pool over a measurement window. The measurement window may correspond to a plurality of slots. A partially used slot-subchannel block in the plurality of slots may be associated with a non-zero contribution to the CBR. The partially used slot-subchannel block may include at least one used mini slot-subchannel block. The apparatus may identify a channel occupancy ratio (CR) limit associated with the sidelink resource pool based on the CBR. The apparatus may select one or more resources associated with a slot from the sidelink resource pool for a sidelink transmission to a second UE based on the CR limit. The apparatus may transmit, to the second UE, the sidelink transmission based on the selected one or more resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
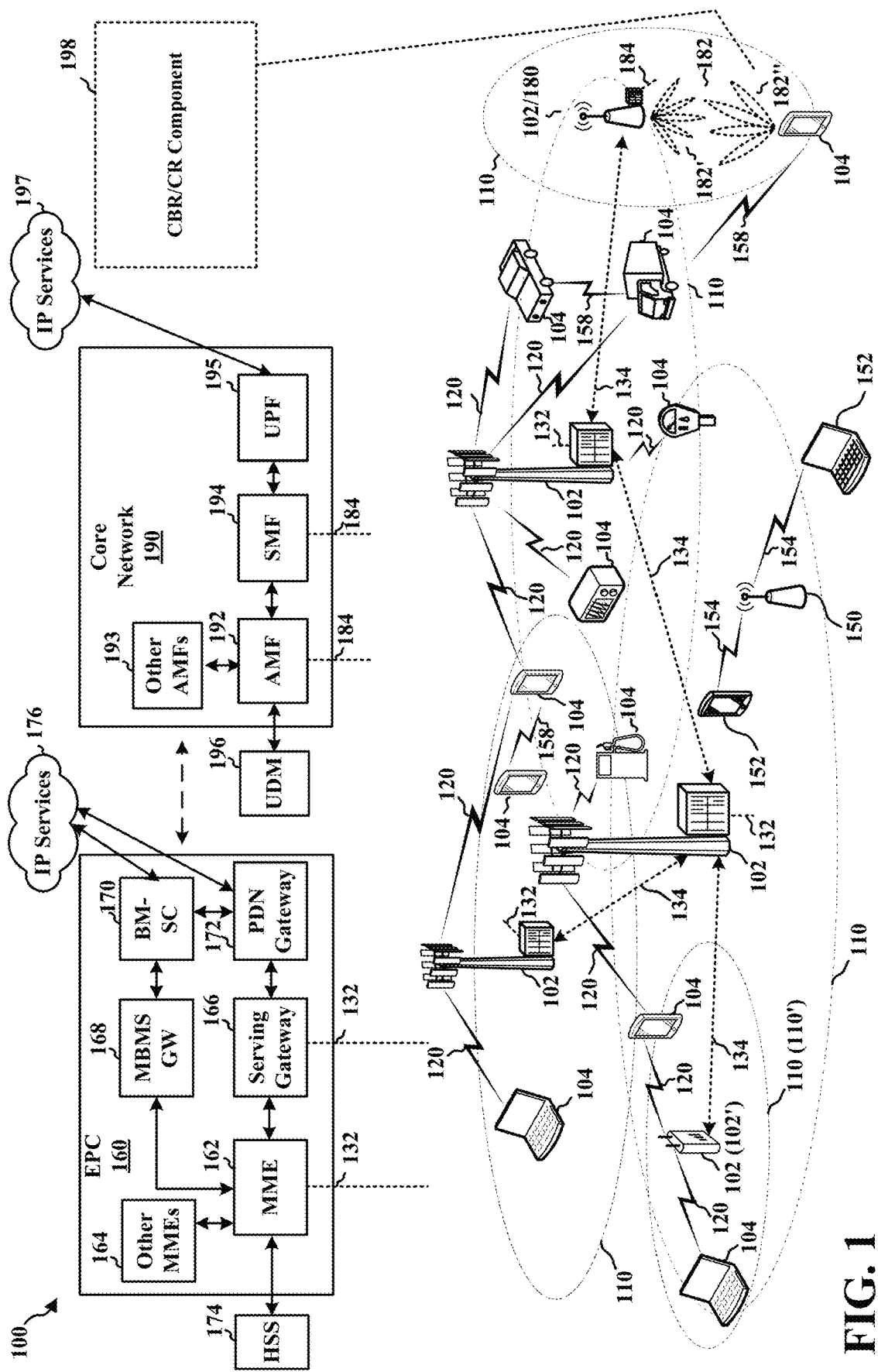
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a CBR/CR component 198 that may be configured to calculate a CBR associated with a sidelink resource pool over a measurement window. The measurement window may correspond to a plurality of slots. A partially used slot-subchannel block in the plurality of slots may be associated with a non-zero contribution to the CBR. The partially used slot-subchannel block may include at least one used mini slot-subchannel block. The CBR/CR component 198 may be configured to identify a CR limit associated with the sidelink resource pool based on the CBR. The CBR/CR component 198 may be configured to select one or more resources associated with a slot from the sidelink resource pool for a sidelink transmission to a second UE based on the CR limit. The CBR/CR component 198 may be configured to transmit, to the second UE, the sidelink transmission based on the selected one or more resources. Although the following description may be focused on 5G NR, the concepts described herein may be applicable to other similar areas, such as LTE, LTE-A, CDMA, GSM, and other wireless technologies.

Figure 2:
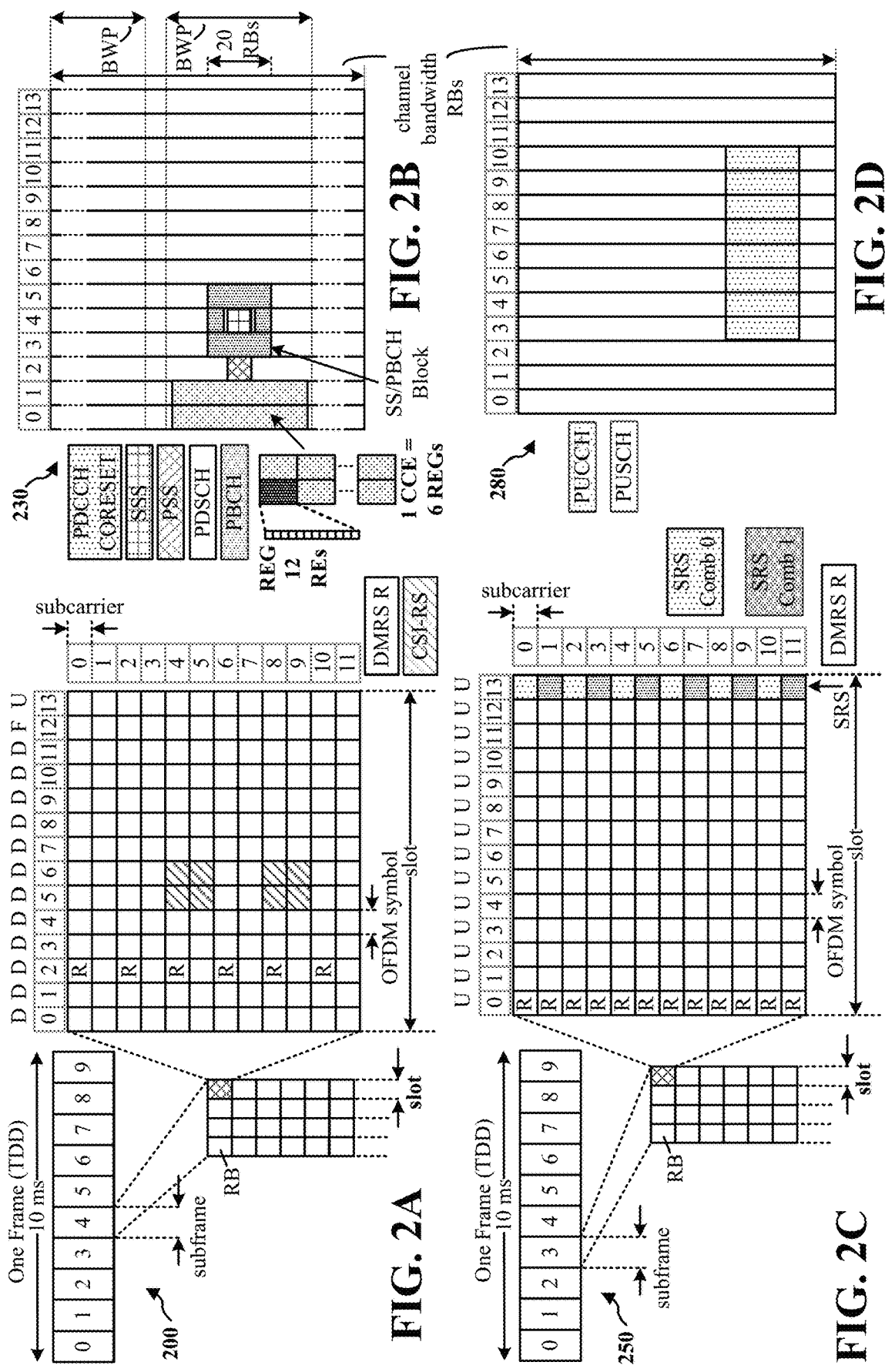
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
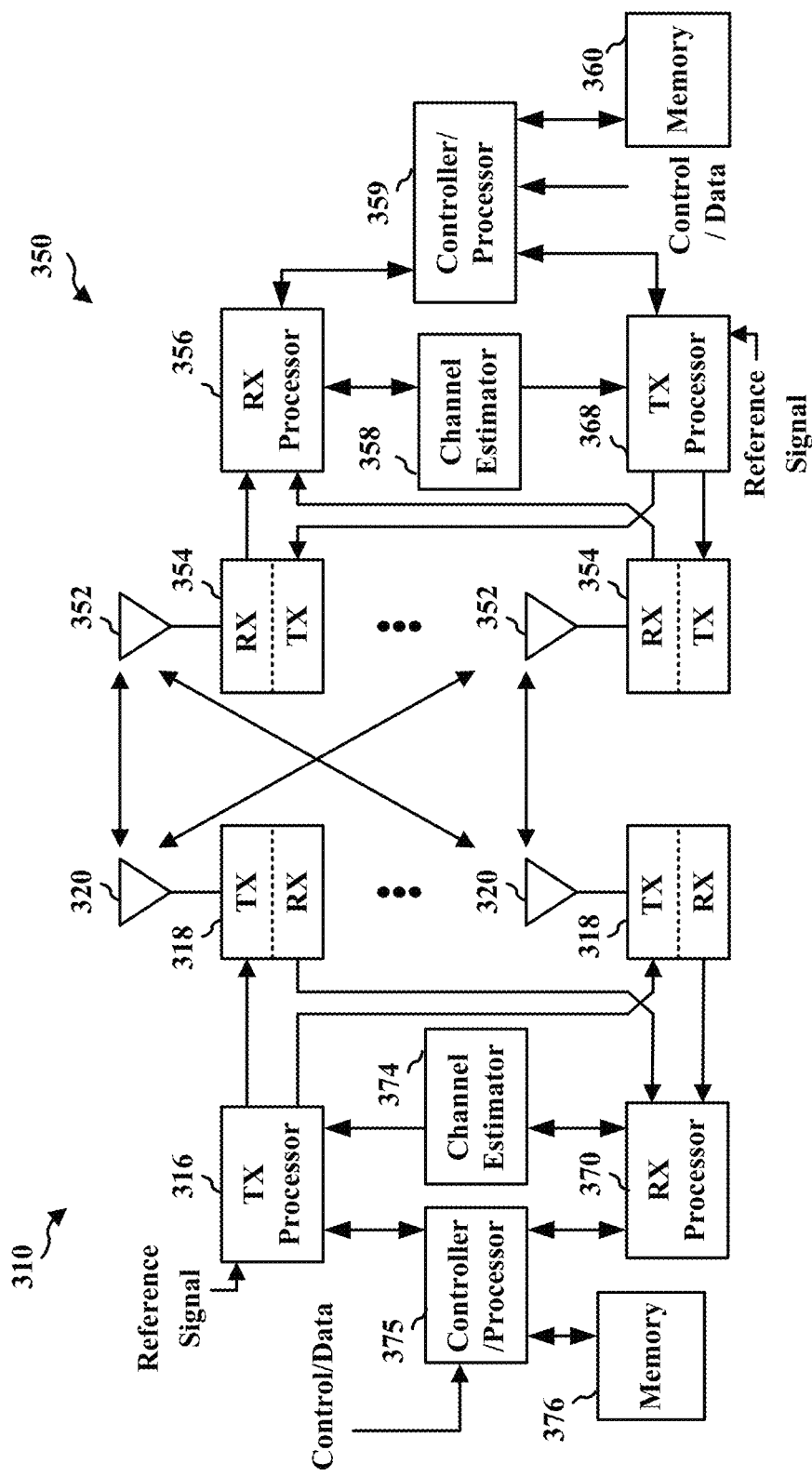
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices, in order to select transmission resources that avoid collisions with other devices. The sidelink transmission and/or the resource reservation may be periodic or aperiodic, where a UE may reserve resources (e.g., using the time resource assignment field of the sidelink control information (SCI)) for transmission in a current slot and up to two future retransmissions.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding SCI transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., subchannels per subframe) reserved by the UE may depend on the size of data to be transmitted by the UE. Although the example is described for a UE receiving reservations from another UE, the reservations may also be received from a roadside unit (RSU) or other device communicating based on sidelink.

Figure 4:
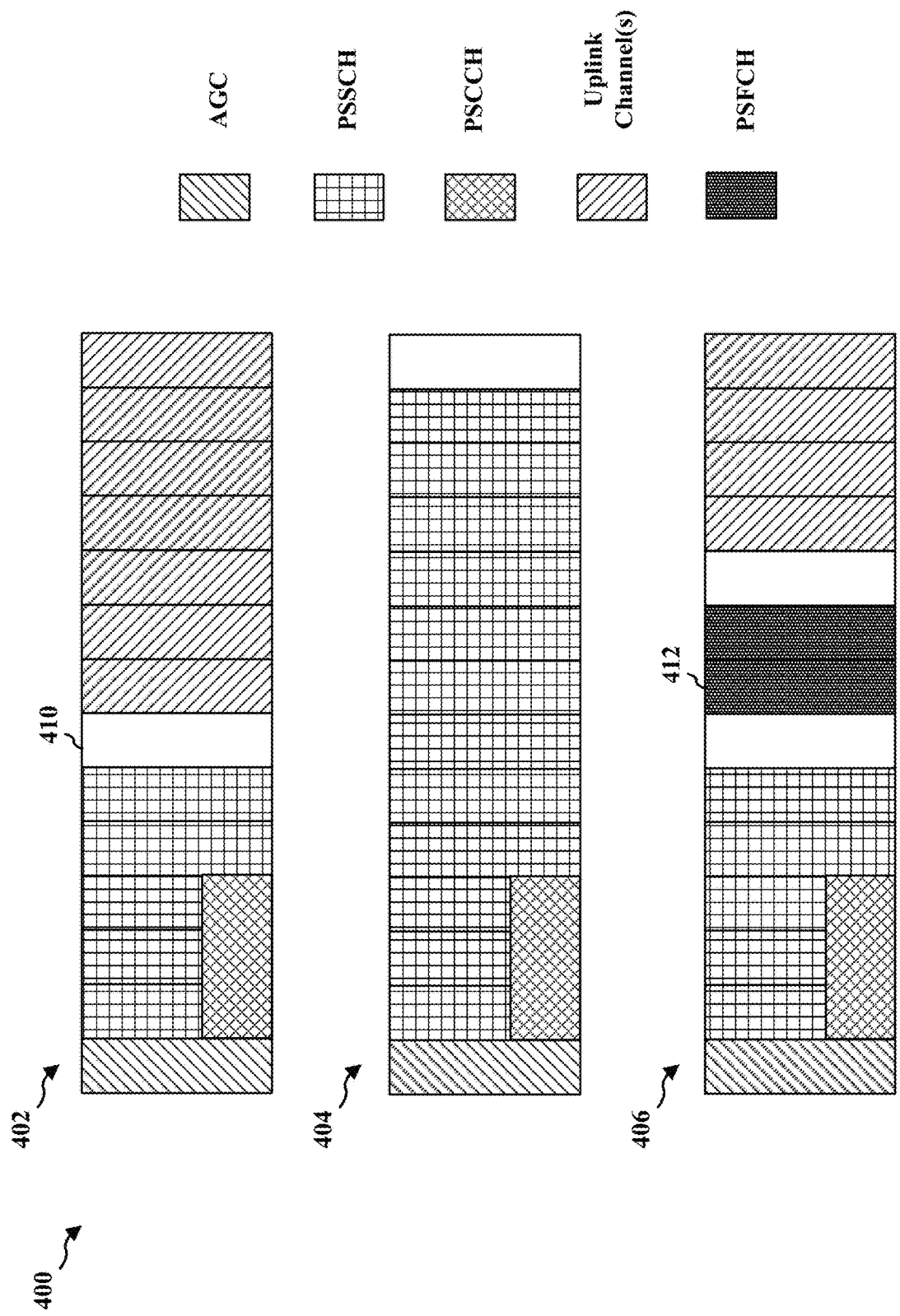
FIG. 4 is a diagram illustrating various example sidelink slot structures.

FIG. 4 is a diagram 400 illustrating various example sidelink slot structures. A slot may be marked for the sidelink if the slot contains OFDM symbols that may be used for sidelink communication. Within a sidelink slot, a number of consecutive symbols may be configured for the sidelink communication. These symbols may be referred to as sidelink symbols, and may correspond to one or more of an automatic gain control (AGC) symbol, a PSSCH, a PSCCH, a physical sidelink feedback channel (PSFCH), or a gap symbol. Within the same sidelink slot, one or more OFDM symbols may also be used for an uplink channel or a downlink channel. The first symbol in the sidelink symbols may be an AGC symbol. A number of sidelink symbols (e.g., 5 to 12 sidelink symbols) starting from the second sidelink symbol may be configured for the PSSCH. The PSCCH may be frequency division multiplexed (FDMed) with the PSSCH in sidelink symbols starting from the second sidelink symbol, and may span a number of symbols (e.g., 2 or 3 symbols). The remaining sidelink symbols may include symbols for a PSFCH or gap symbols. A gap symbol may provide a gap between two sidelink channels, or between a sidelink channel and an uplink/downlink channel. Based on the channels separated by a gap symbol, a UE may utilize the gap period provided by the gap symbol to switch beams or switch communication directions (e.g., from RX to TX, or vice versa).

In the example slot 402, the sidelink symbols may include the first 7 symbols. The first sidelink symbol may be an AGC symbol. The second sidelink symbol through the sixth sidelink symbol may be used for a PSSCH. A PSCCH may be FDMed with the PSSCH in the second sidelink symbol through the fourth sidelink symbol. In the example slot 402 shown, the last 7 symbols may be used for one or more uplink channels. The last sidelink symbol (i.e., the seventh sidelink symbol 410) may be a gap symbol 410. The UE may utilize the gap period provided by the gap symbol 410 to switch beams or switch communication directions.

In the example slot 404, the sidelink symbols may include all 14 symbols in the slot. The first sidelink symbol may be an AGC symbol. The second sidelink symbol through the thirteenth sidelink symbol may be used for a PSSCH. A PSCCH may be FDMed with the PSSCH in the second sidelink symbol through the fourth sidelink symbol. The last sidelink symbol (i.e., the fourteenth sidelink symbol) may be a gap symbol.

Further, in the example slot 406, the sidelink symbols may include the first 10 symbols. The first sidelink symbol may be an AGC symbol. The second sidelink symbol through the sixth sidelink symbol may be used for a PSSCH. A PSCCH may be FDMed with the PSSCH in the second sidelink symbol through the fourth sidelink symbol. The seventh sidelink symbol may be a gap symbol that may separate the PSSCH from a PSFCH, which may span the eighth and the ninth sidelink symbols. The first symbol for the PSFCH (i.e., the eighth sidelink symbol 412) may also be used for the purpose of AGC. In the example slot 406 shown, the last 4 symbols may be used for one or more uplink channels. The last sidelink symbol (i.e., the tenth sidelink symbol) may be a gap symbol that may separate the PSFCH from the uplink channels.

Figure 5:
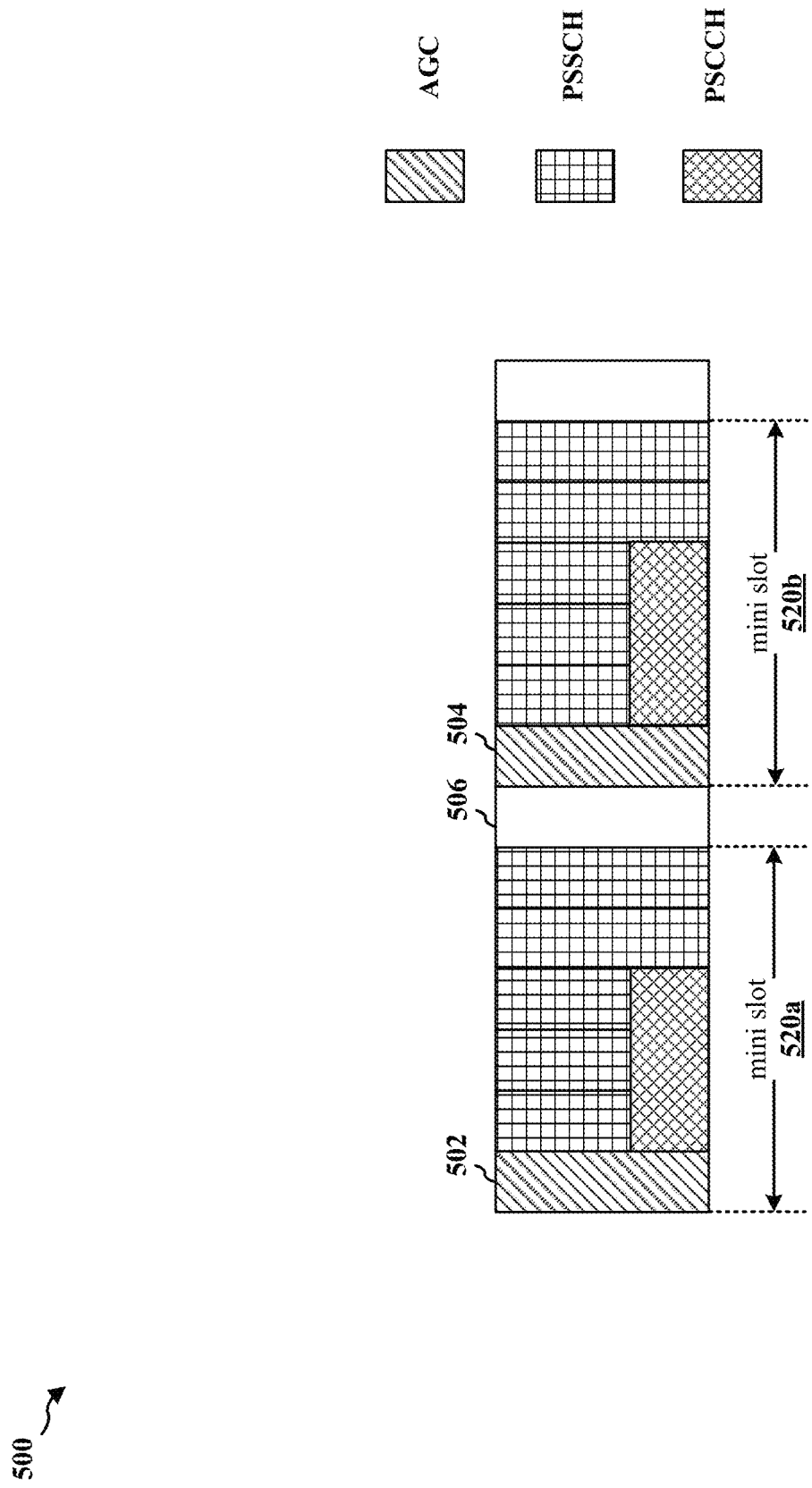
FIG. 5 is a diagram illustrating an example sidelink slot including two mini slots.

FIG. 5 is a diagram illustrating an example sidelink slot 500 including two mini slots. A sidelink slot may be segmented into two or more mini sidelink slots (which may be referred to herein simply as mini slots). As shown in FIG. 5, the example sidelink slot 500 may include two mini slots: The first mini slot 520a may correspond to the first symbol through the sixth symbol of the slot 500, and the second mini slot 520b may correspond to the eighth symbol through the thirteenth symbol of the slot 500. Each mini slot 520a or 520b may contain its respective SCI via its respective PSSCH. Accordingly, the SCI of one mini slot may span a number of symbols (e.g., 2 or 3 symbols). Further, as shown in FIG. 5, a gap symbol 506 may be provided between two mini slots 520a and 520b. Another gap symbol may be provided at the end of the sidelink slot 500 to separate the second mini slot 520b in the sidelink slot 500 from the first channel in the subsequent slot.

Moreover, as shown in FIG. 5, the first symbol of each of the mini slots 520a or 520b (e.g., the symbol 502 or the symbol 504) may be an AGC symbol. The respective RX UE may use the AGC symbol to set the AGC. The different mini slots within a sidelink slot may be used by different sidelinks (where a sidelink may correspond to a pair of UEs), which may be explained in further detail below. In other words, a TX UE may not use an entire sidelink slot for sidelink transmission to a particular RX UE. Instead, the TX UE may use one mini slot within the sidelink slot, which may correspond to a portion of the sidelink slot, for sidelink transmission to the particular RX UE. Accordingly, using one sidelink slot, a UE may transmit and/or receive via multiple mini slots to and/or from multiple, different other UEs. Of course, while some UEs may use mini slots for sidelink communications, other UEs in the same communication environment may still utilize slot based sidelink communications. In other words, slots and mini slots may coexist in the same communication environment.

Figure 6:
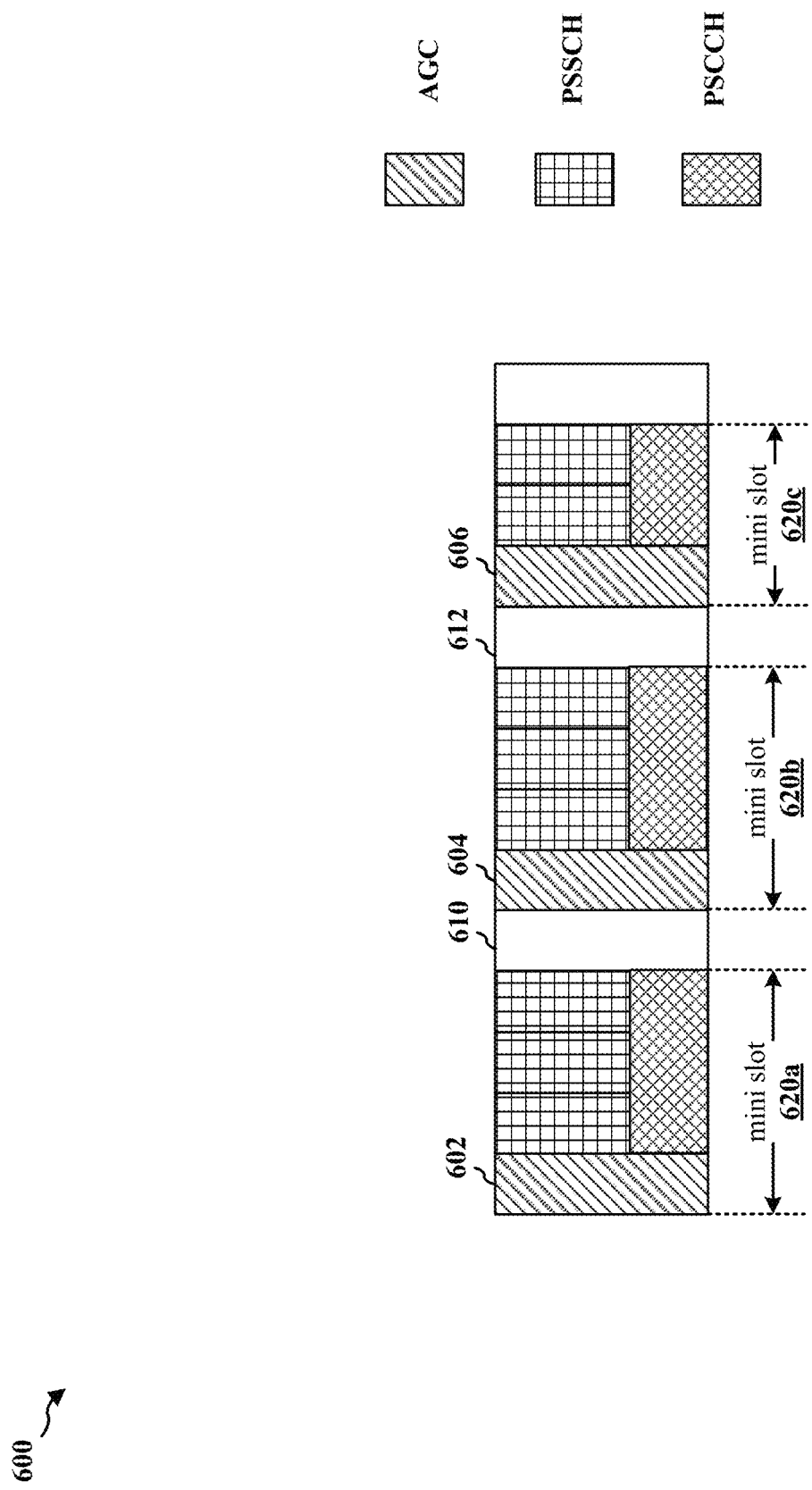
FIG. 6 is a diagram illustrating another example sidelink slot including three mini slots.

FIG. 6 is a diagram illustrating another example sidelink slot 600 including three mini slots. As shown in FIG. 6, the example sidelink slot 600 may include three mini slots: The first mini slot 620a may correspond to the first symbol through the fourth symbol of the slot 600, the second mini slot 620b may correspond to the sixth symbol through the ninth symbol of the slot 600, and the third mini slot 620c may correspond to the eleventh symbol through the thirteenth symbol of the slot 600. Each mini slot 620a, 620b, or 620b may contain its respective SCI via its respective PSSCH. Accordingly, the SCI of one mini slot may span a number of symbols (e.g., 2 or 3 symbols). Further, as shown in FIG. 6, gap symbols 610 and 612 may be provided between consecutive mini slots 620a and 620b and between consecutive mini slots 620b and 620c, respectively. Another gap symbol may be provided at the end of the sidelink slot 600 to separate the third mini slot 620c in the sidelink slot 600 from the first channel in the subsequent slot.

Moreover, as shown in FIG. 6, the first symbol of each of the mini slots 620a, 620b, or 620c (e.g., the symbol 602, 604, or 606) may be an AGC symbol. The respective sidelink RX UE may use the AGC symbol to set the AGC.

Figure 7:
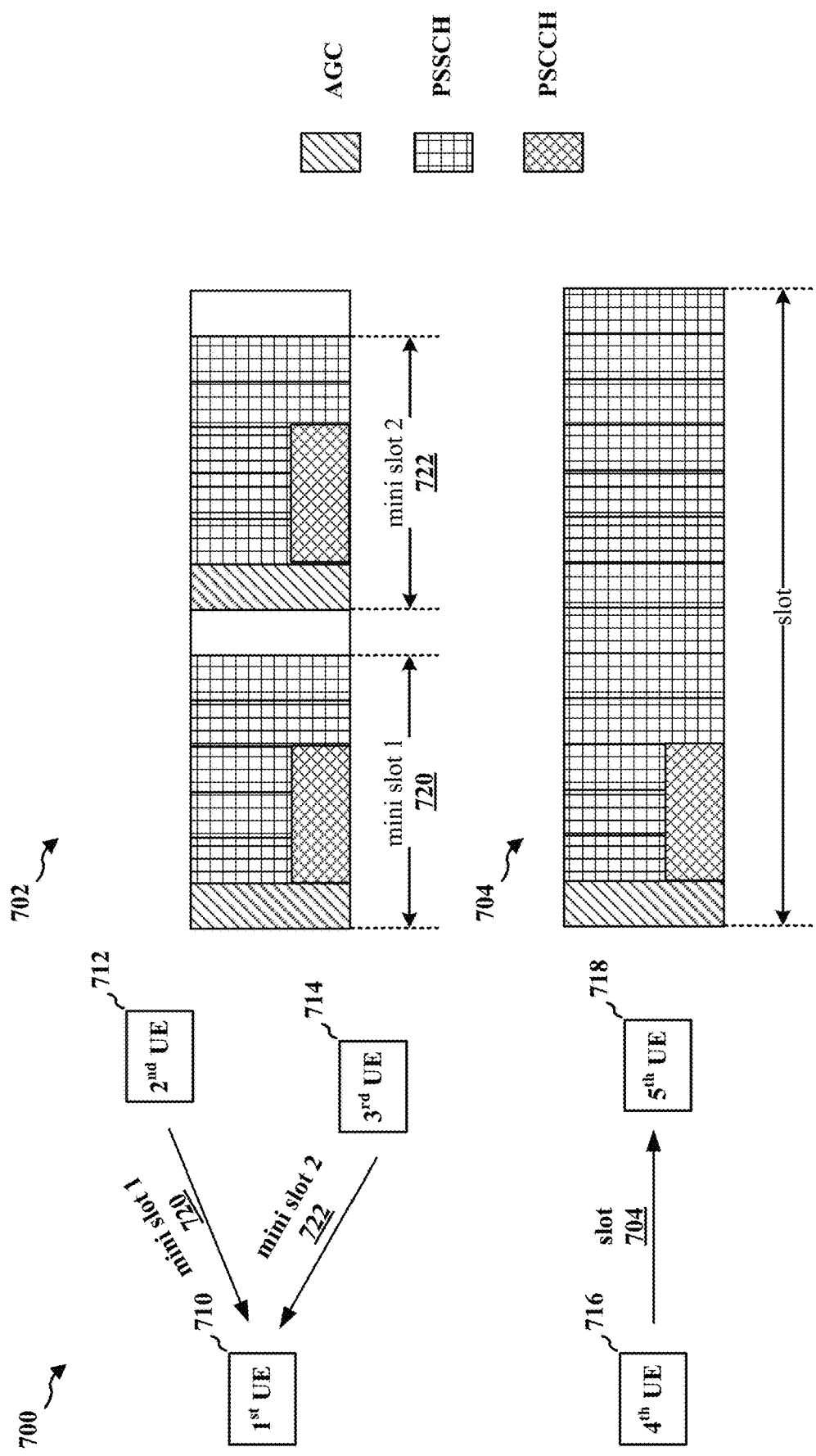
FIG. 7 is a diagram illustrating an example communication environment.

FIG. 7 is a diagram illustrating an example communication environment 700. Within the communication environment 700, a first UE 710 may receive a sidelink transmission from a second UE 712 via a first mini slot 720 in a slot 702, and may receive a sidelink transmission from a third UE 714 via a second mini slot 722 in the same slot 702. Here the slot 702 may be similar to the slot 500 illustrated in FIG. 5, and may include two mini slots: the first mini slot 720 and the second mini slot 722. Within the same communication environment 700, a fourth UE 716 may transmit a sidelink transmission to a fifth UE 718 via a slot 704. The slot 704 may not include any mini slots. Accordingly, when the fourth UE 716 performs sensing and resource selection for a slot (e.g., the slot 704) for Mode 2 sidelink communication, the fourth UE 716 may consider mini slot reservations that may overlap with the slot in time and/or in frequency.

In one or more configurations where mini slots are not considered, a channel busy ratio (CBR) associated with a sidelink resource pool may be measured by a UE. A CBR measured for a slot n may be defined as the fraction (portion) of used slot-subchannel blocks in the resource pool over a CBR measurement window as sensed by the measuring UE. Hereinafter a slot n may refer to a slot with a slot index of n. A larger slot index may be associated with a later slot. In some examples, a used slot-subchannel block may be associated with a sidelink received signal strength (which may be in Watts (W), and may be indicated by a sidelink received signal strength indicator (RSSI)) as measured by the UE that exceeds a first preconfigured threshold (also referred to as threshold A hereinafter). The CBR measurement window may be a time period, and may correspond to a continuous range of slots that may precede the slot n. In one or more examples, the CBR measurement window associated with the slot n may be [n–a, n–1] (i.e., a continuous slot range from the slot n–a to the slot n–1, inclusive). In some examples, a may be equal to 100 or $100 \cdot 2^\mu$ slots (i.e., multiples of 100 slots). In some examples, the duration of the CBR measurement window (e.g., the value of a or μ) may be configured using a higher layer parameter (e.g., the parameter "timeWindowSize-CBR"), which may be RRC configured.

In one or more configurations, the sidelink received signal strength (or the sidelink RSSI) of a slot-subchannel block may be the linear average of the total received power (in W) observed in the slot-subchannel block over sidelink OFDM symbols configured for the sidelink channels (e.g., the PSCCH or the PSSCH), starting from the second sidelink OFDM symbol (e.g., the power observed in the first (AGC) sidelink symbol may be ignored).

In one or more configurations, for FR 1, the reference point for the sidelink received signal strength (or the sidelink RSSI) may be the antenna connector of the UE. For FR 2, the sidelink received signal strength (or the sidelink RSSI) may be measured based on the combined signal from antenna elements corresponding to a given receiver branch. Further, for FR 1 and FR 2, if receiver diversity is in use at the UE, the reported value for the sidelink received signal strength (or the sidelink RSSI) may not be lower than the corresponding value for the sidelink received signal strength (or the sidelink RSSI) of any of the individual receiver branches.

Figure 8:
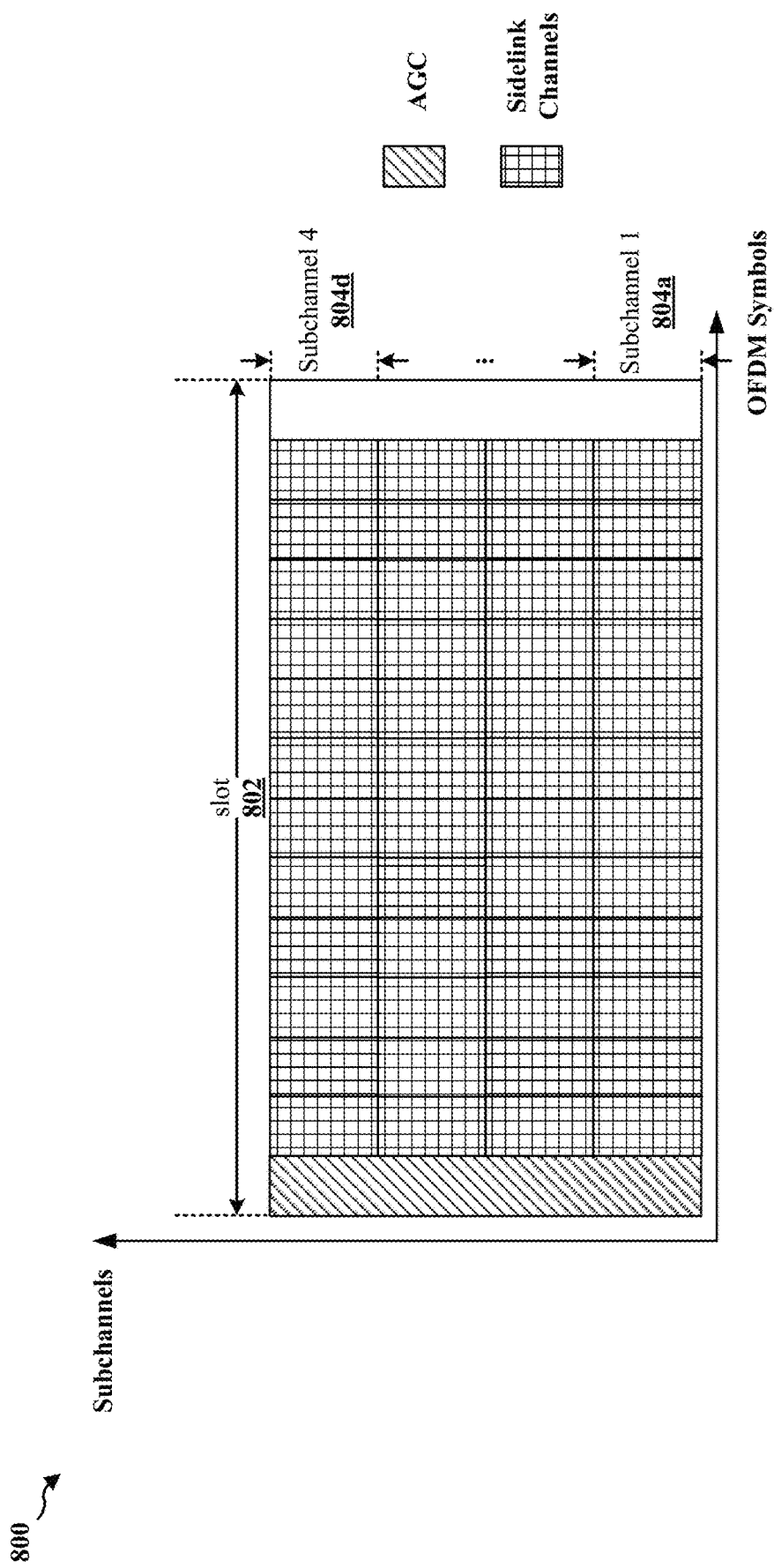
FIG. 8 is a diagram illustrating the measurement of the sidelink received signal strength associated with various example slot-subchannel blocks within an example slot.

FIG. 8 is a diagram 800 illustrating the measurement of the sidelink received signal strength associated with various example slot-subchannel blocks within an example slot. In an example sidelink slot 802, four subchannels including the first subchannel 804a through the fourth subchannel 804d are illustrated. Accordingly, four slot-subchannel blocks are illustrated in FIG. 8. A sidelink received signal strength may be measured for each of the four slot-subchannel blocks. For example, the sidelink received signal strength associated with the slot 802—fourth subchannel 804d block may be a (linear) average of received power in the fourth subchannel 804d over the 12 OFDM symbols (the second symbol through the thirteenth symbol) configured for sidelink channels (e.g., the PSCCH or the PSSCH) in the slot 802. The power observed in the AGC symbol (i.e., the first symbol) in the slot 802 may be ignored. Further, no power may be observed in the gap symbol (i.e., the last symbol) in the slot 802.

Figure 9:
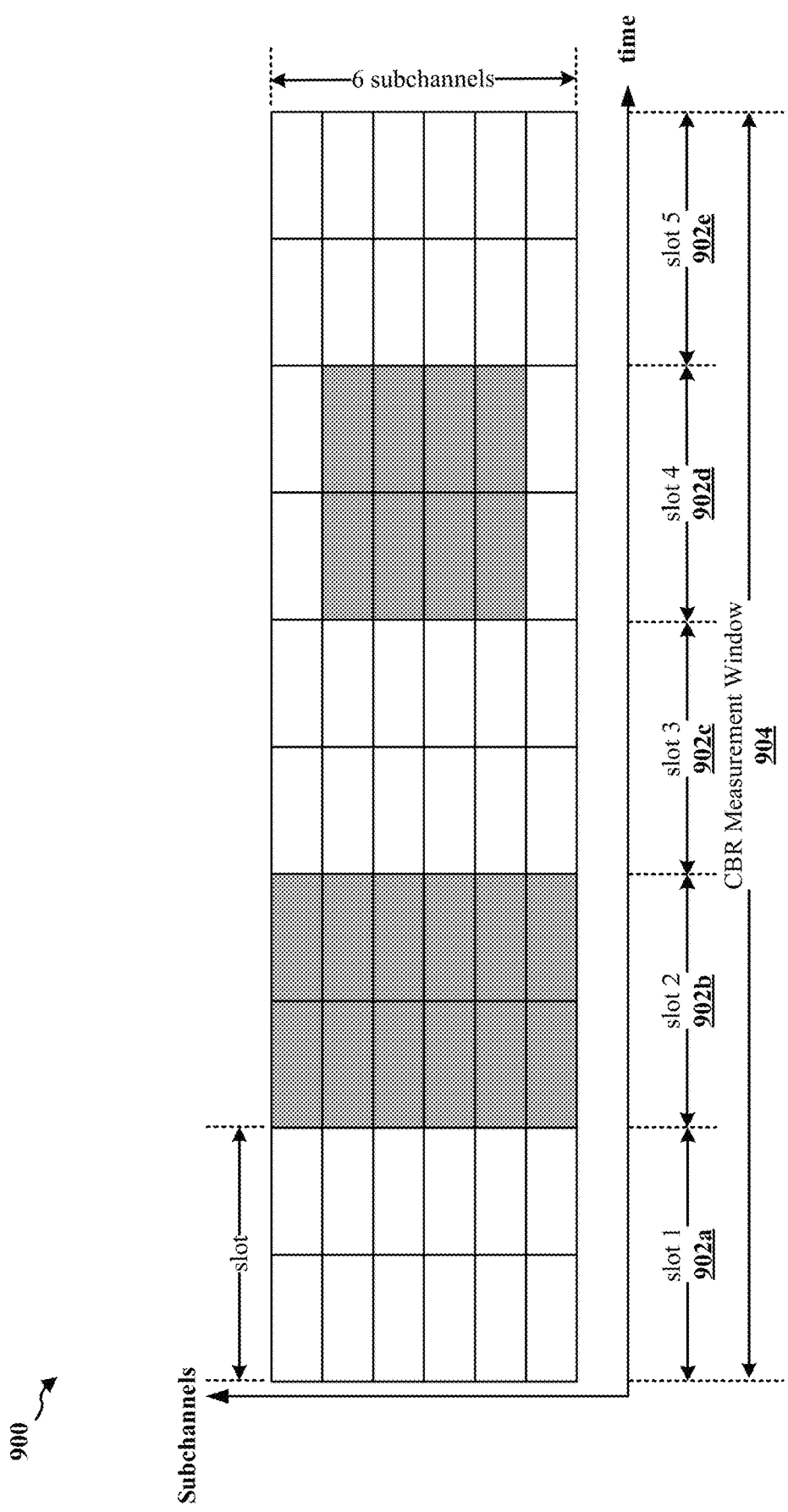
FIG. 9 is a diagram illustrating an example of slot CBR measurement where no mini slots are used or considered.

FIG. 9 is a diagram 900 illustrating an example of slot CBR measurement where no mini slots are used or considered. As illustrated in FIG. 9, the example CBR measurement window 904 may correspond to 5 continuous sidelink slots including a first slot 902a through a fifth slot 902e. Therefore, in the illustrated example, the CBR may be measured for a slot directly subsequent to the fifth slot 902e. The shading in FIG. 9 may indicate that the corresponding slot-subchannel block is used in observed sidelink communications. In other words, the observed sidelink received signal strength associated with the shaded slot-subchannel blocks may be greater than the first preconfigured threshold. As shown in FIG. 9, within the CBR measurement window 904, there may be 6 used slot-subchannel blocks in the second slot 902b and 4 used slot-subchannel blocks in the fourth slot 902d. Further, there may be 30 slot-subchannel blocks in total within the CBR measurement window 904 (=6 slot-subchannel blocks per slot x 5 slots in the CBR measurement window 904). Therefore, in the illustrated example, the measured CBR, which may be the fraction of used slot-subchannel blocks within the CBR measurement window 904, may be (6+4)/30=⅓=0.33.

A measured CBR may be used for various purposes. For example, a UE may select a number of HARQ retransmissions for sidelink transmissions based on the measured CBR. In another example, a UE may select the number of subchannels to be used for the PSSCH or the PSCCH (e.g., the "$L_{subCH}$" parameter) based on the measured CBR. In a further example, a UE may select a modulation and coding scheme (MCS) for sidelink transmissions based on the measured CBR. In yet another example, a UE may select a CR limit based on the measured CBR.

In particular, for congestion control, if a UE is configured with higher layer parameter "sl-CR-Limit" and transmits PSSCH in a slot n, the UE may ensure the following limits for any priority value k:

$$\sum_{i \geq k} CR(i) \leq CR_{Limit}(k)$$

where CR(i) may be the CR evaluated in the slot n-N for the PSSCH transmissions with "Priority" field in the SCI set to i, and $CR_{Limit}(k)$ may correspond to the high layer parameter "sl-CR-Limit" that is associated with the priority value k and the CBR range which may include the CBR measured in the slot n-N, where N may be the congestion control processing time. Herein the term $CR_{Limit}(k)$ may be referred to as the CR limit. In some examples, N may be an integer within the range from 2 to 16, and may be dependent on the SCS and/or the UE capability. How the above limits are met may be dependent upon UE implementation. In some examples, the UE may drop the transmissions in the slot n in order to meet the limits.

Figure 10:
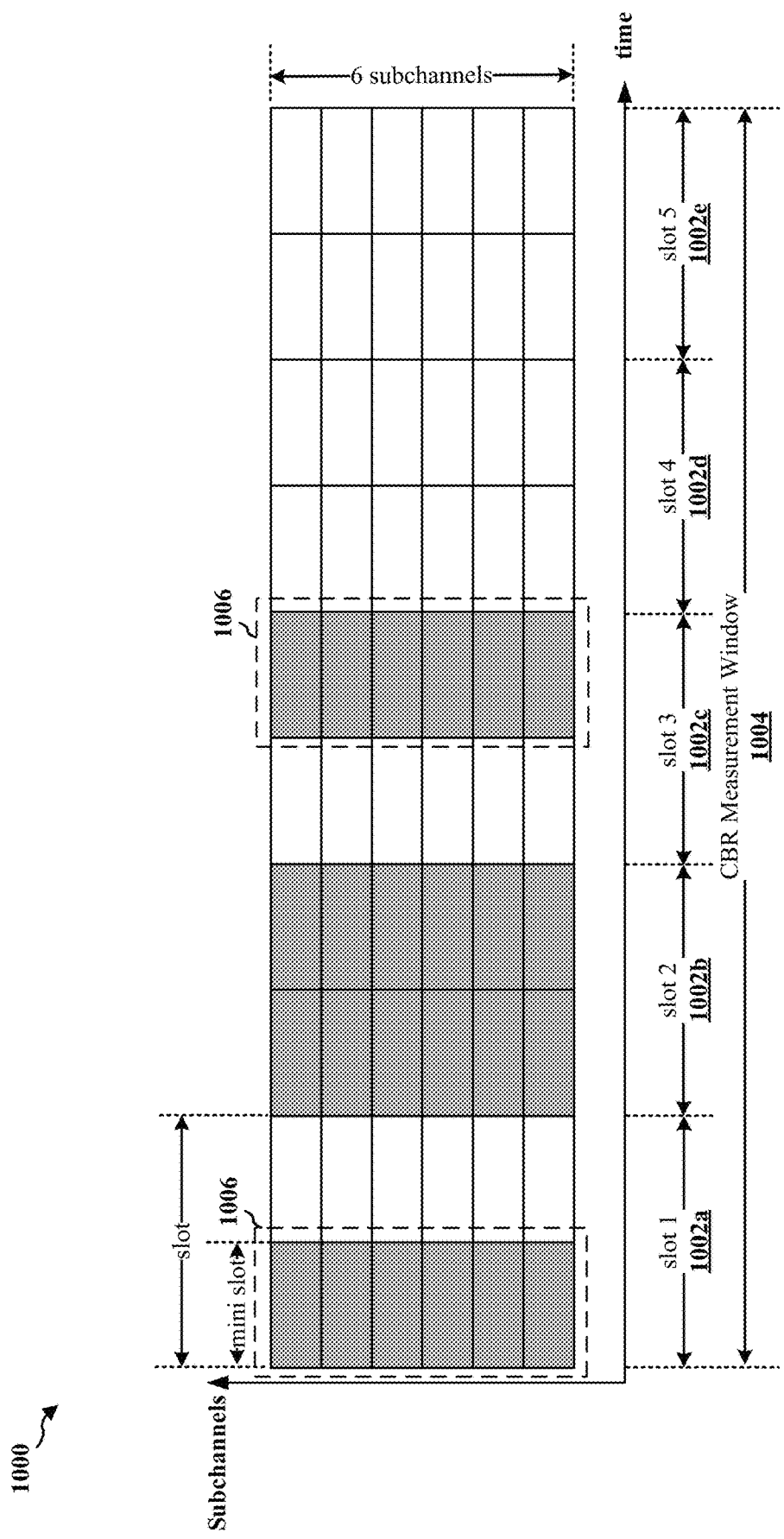
FIG. 10 is a diagram illustrating an example of slot CBR measurement where mini slots are used.

FIG. 10 is a diagram 1000 illustrating an example of slot CBR measurement where mini slots are used. As illustrated in FIG. 10, the example CBR measurement window 1004 may correspond to 5 continuous slots including a first slot 1002a through a fifth slot 1002e. Therefore, in the illustrated example, the CBR may be measured for the slot directly subsequent to the fifth slot 1002e. In FIG. 10, the slot-subchannel blocks in the first slot 1002a and the third slot 1002c may be partially used, that is, mini slot based sidelink transmissions may have occurred in each of the slot-subchannel blocks in the first slot 1002a and the third slot 1002c. These slot-subchannel blocks, however, may not count as used slot-subchannel blocks based on the criterion described above because once the received sidelink transmission power associated with the mini slot based sidelink transmissions is averaged over all OFDM symbols configured for sidelink channels in the entire respective slot, the resulting average sidelink received power strength may not be greater than the first preconfigured threshold. Therefore, if the same process of measuring the CBR as the one described above in relation to FIG. 9 is used, for FIG. 10, within the CBR measurement window 1004, there may be 6 used slot-subchannel blocks in the second slot 1002b and the same 30 slot-subchannel blocks in total. Therefore, the CBR would be 6/30=0.2.

In this case, a CBR of 0.2 may be a misleading figure, and may underrepresent the actual congestion level of the resource pool because the mini slot based sidelink transmissions in the partially used first slot 1002a and the partially used third slot 1002c may have been ignored. If the mini slot based sidelink transmissions in the first slot 1002a and the third slot 1002c instead take place within a same slot, the actual congestion level of the resource pool arguably may not change; however, the CBR measured based on the same measurement process above would be (6+6)/30=0.4 instead, which may arguably be a better reflection of the actual congestion level of the resource pool. If the actual congestion level is higher than that indicated by the calculated CBR, a UE may become over-aggressive in its attempt to claim resources for its own transmission. For example, the CBR may be used by the UE to determine the number of RBs to use for its PSSCH or PSCCH (e.g., the UE may select the value of the "$L_{subCH}$" parameter based on the CBR). However, if the actual congestion level is higher than that indicated by the calculated CBR, then the UE may exacerbate the congestion by consuming more RBs than the UE would have used based on a more accurate representation of the actual congestion level.

Accordingly, a process for measuring the CBR while taking into account the contribution to the congestion level of mini slot based sidelink transmissions in partially used slot-subchannel blocks may be suitable or desirable. For example, some UEs may not use the unused portions of partially used slot-subchannel blocks. To these UEs, partially used slot-subchannel blocks and fully occupied slot-subchannel blocks may be considered the same for the purpose of identifying the congestion level of the resource pool. In other words, it may be a more accurate representation of the actual congestion level for these UEs to view the partially used slot-subchannel blocks as creating the same amount of congestion as the fully occupied slot-subchannel blocks. In general, a high CBR may indicate a high congestion level, which may also indicate fewer available resources. To the UEs that may not use for their own transmission the partially used slot-subchannel blocks, counting the partially used slot-subchannel blocks the same way as counting the fully occupied slot-subchannel blocks in CBR calculation may yield, for such UEs, a better measure of the available resources. Accordingly, these UEs may select resources for their own transmission (e.g., select the value of the "$L_{subCH}$" parameter) based on a partially used slot-subchannel block being associated with a non-zero contribution to the calculation of the CBR, which may result in a better measure of the available resources than if such a partially used slot-subchannel block did not contribute to the calculation of the CBR.

In one or more configurations, the used slot-subchannel blocks (e.g., the slot-subchannel blocks whose average sidelink received power strength over all symbols configured for sidelink channels in the entire slot is greater than the first preconfigured threshold) (which may not include partially used slot-subchannel blocks) may be counted in the same way as described above in the slot CBR measurement. Further, a partially used slot-subchannel block may be defined. The average sidelink received power strength over all symbols configured for sidelink channels in the entire slot may be less than the first preconfigured threshold for a partially used slot-subchannel block. Yet, a partially used slot-subchannel block may include at least one mini slot-subchannel block whose average (e.g., a linear average) sidelink received power strength over all symbols configured for sidelink channels (e.g., the PSCCH or the PSSCH)

(not including any AGC symbol, such as the first symbol in the mini slot) in the mini slot is greater than a second preconfigured threshold (which may be referred to as threshold B herein). Accordingly, herein partially used slot-subchannel blocks may be distinguishable from used slot-subchannel blocks. A reference to one of a used slot-subchannel block or a partially used slot-subchannel block may not include a reference to the other. A mini slot-subchannel block whose average sidelink received power strength over all symbols configured for sidelink channels in the mini slot is greater than the second preconfigured threshold may be referred to as a used mini slot-subchannel block. In one or more examples, the first preconfigured threshold may be the same as, or may be different from, the second preconfigured threshold.

In one or more configurations, the number of used mini slot-subchannel blocks within partially used slot-subchannel blocks may be counted and added to the number of used slot-subchannel blocks when a UE measures the CBR. In one or more configurations, the number of used mini slot-subchannel blocks within partially used slot-subchannel blocks may be discounted (e.g., by a discount factor α1, which may be greater than 0 and equal to or less than 1) when being counted before being added to the number of used slot-subchannel blocks in the process of CBR measurement. Therefore, within a measurement window including n1 slot-subchannel blocks in total, if there are k1 used slot-subchannel blocks and k2 used mini slot-subchannel blocks within partially used slot-subchannel blocks, the CBR may be calculated based on a formula $$CBR = \frac{k1 + \alpha 1 k2}{n1}.$$

Herein n1, k1, and k2 may be positive integers. In one or more configurations, the first discount factor (α1) may be prespecified or preconfigured. In one or more configurations, the first discount factor (α1) may be dynamically configured via RRC signaling (e.g., per sidelink resource pool) or a DCI message.

Figure 11:
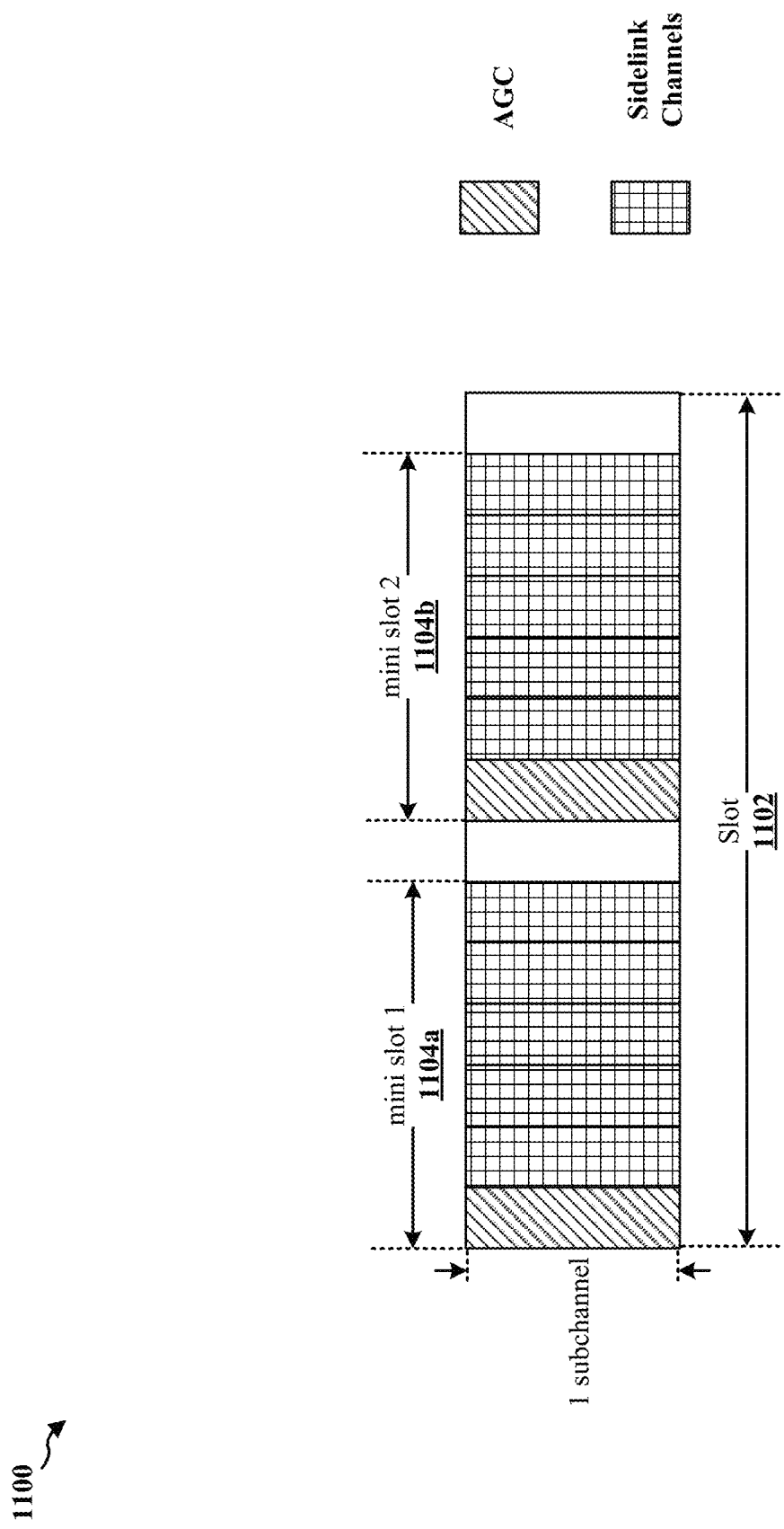
FIG. 11 is a diagram illustrating an example partially used slot-subchannel block.

FIG. 11 is a diagram illustrating an example partially used slot-subchannel block 1100. The average sidelink received power strength associated with the slot-subchannel block 1100 over all symbols configured for sidelink channels in the entire slot 1102 (e.g., 10 symbols including the second symbol through the sixth symbol and the ninth symbol through the thirteenth symbol) may be less than the first preconfigured threshold. Therefore, the slot-subchannel block 1100 may not be a used slot-subchannel block. Further, the slot-subchannel block 1100 may include two mini slot-subchannel blocks (e.g., the first mini slot 1104a-subchannel block and the second mini slot 1104b-subchannel block) each of which may be associated with an average sidelink received power strength over all symbols configured for sidelink channels in the respective mini slot 1104a or 1104b (e.g., the second symbol through the sixth symbol, and the ninth symbol through the thirteenth symbol, respectively) that is greater than the second preconfigured threshold (in this example, the second preconfigured threshold may be less than the first preconfigured threshold). Accordingly, the two mini slot-subchannel blocks may be used mini slot-subchannel blocks, and the slot-subchannel block 1100 may be a partially used slot-subchannel block. Therefore, in one or more configurations, being used mini slot-subchannel blocks within a partially used slot-subchannel block, the two mini slot-subchannel blocks may be counted and added to the number of used slot-subchannel blocks when a UE measures the CBR. In one or more configurations, the number of used mini slot-subchannel blocks within partially used slot-subchannel blocks may be discounted when being counted before being added to the number of used slot-subchannel blocks in the process of CBR measurement.

Referring back to FIG. 10, in one or more configurations, based on the process and criteria described above, the mini slot-subchannel blocks 1006 in the first slot 1002a and the third slot 1002c may be used mini slot-subchannel blocks, and the slot-subchannel blocks in the first slot 1002a and the third slot 1002c may be partially used slot-subchannel blocks. Accordingly, the used mini slot-subchannel blocks 1006 in the first slot 1002a and the third slot 1002c may be counted and added to the number of used slot-subchannel blocks when a UE measures the CBR. Accordingly, if the first discount factor (α1) is ½, the CBR may be calculated as (6 used slot-subchannel blocks in the second slot 1002b+ ½×12 used mini slot-subchannel blocks in the first slot 1002a and the third slot 1002c)/30 slot-subchannel blocks in total in the CBR measurement window=0.4. Moreover, if the first discount factor (α1) is 1, the CBR may be calculated as (6 used slot-subchannel blocks in the second slot 1002b+ 1×12 used mini slot-subchannel blocks in the first slot 1002a and the third slot 1002c)/30 slot-subchannel blocks in total in the CBR measurement window=0.6. In some examples, a larger first discount factor (α1), such as a first discount factor (α1) of 1 or close to 1, may be used because, for example, a UE transmitting slot based sidelink transmissions may not change the number of HARQ retransmissions or the MCS (which may be selected based on the measured CBR) mid-slot at the boundary of a mini slot. These facts may be reflected by the choice of a larger first discount factor (α1).

Figure 12:
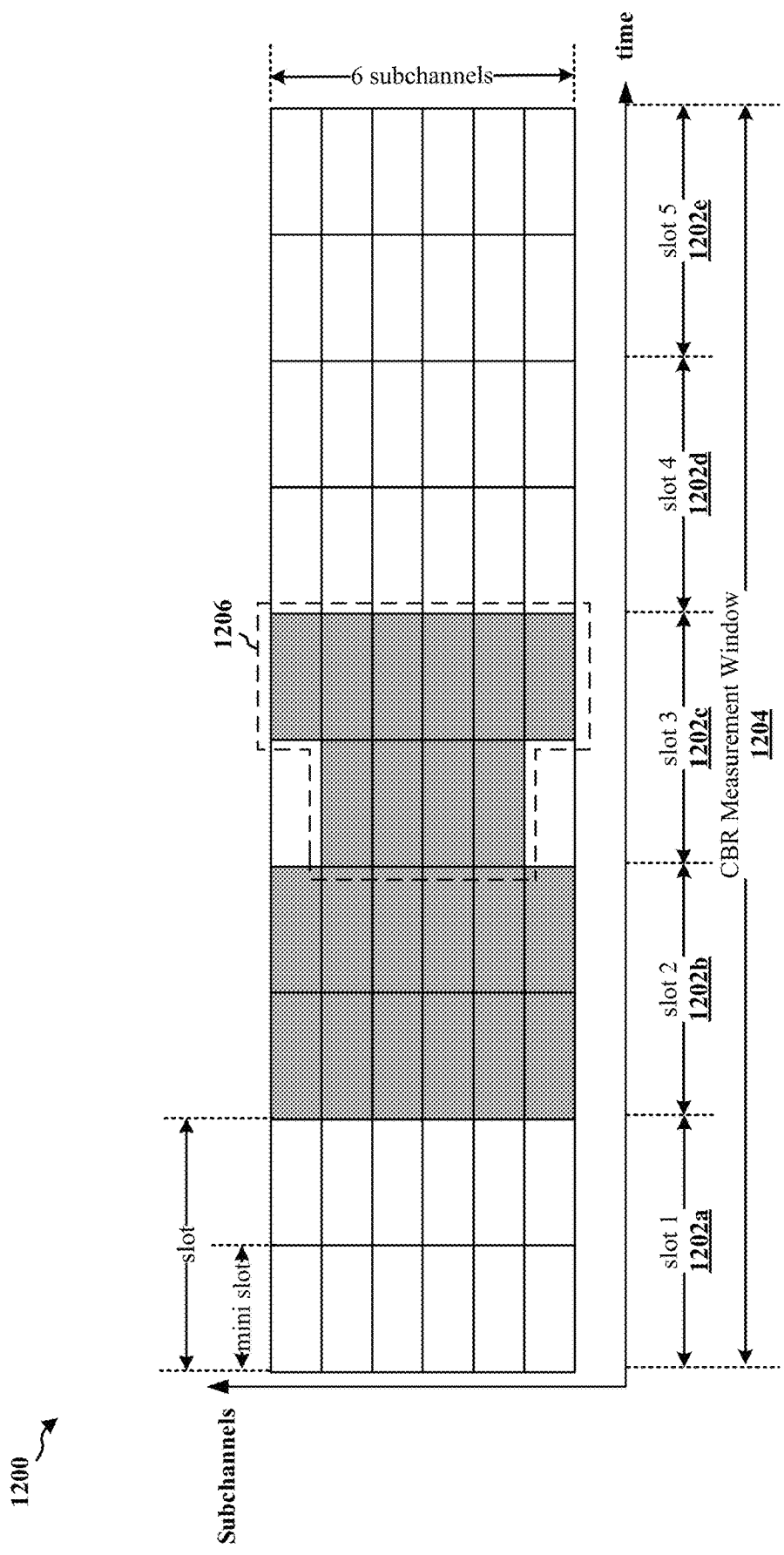
FIG. 12 is a diagram illustrating another example of slot CBR measurement where mini slots are used.

FIG. 12 is a diagram 1200 illustrating another example of slot CBR measurement where mini slots are used. As illustrated in FIG. 12, the example CBR measurement window 1204 may correspond to 5 continuous slots including a first slot 1202a through a fifth slot 1202e. Therefore, in the illustrated example, the CBR may be measured for the slot directly subsequent to the fifth slot 1202e. In one or more configurations, based on the process and criteria described above, the 10 mini slot-subchannel blocks 1206 in the third slot 1202c may be used mini slot-subchannel blocks, and the 6 slot-subchannel blocks in the third slot 1202c may be partially used slot-subchannel blocks (this may be because the second preconfigured threshold may be less than the first preconfigured threshold, as described above). Accordingly, in one or more configurations, if the first discount factor (α1) is ½, the CBR may be calculated as (6 used slot-subchannel blocks in the second slot 1202b+ ½×10 used mini slot-subchannel blocks in the third slot 1202c)/30 slot-subchannel blocks in total in the CBR measurement window=11/30=0.37.

In one or more other configurations, if partially used slot-subchannel blocks within a slot include different numbers of used mini slot-subchannel blocks at different mini slot indexes, the used mini slot-subchannel blocks associated with those mini slot indexes that are not associated with the greatest (largest) number of used mini slot-subchannel blocks may be ignored in the counting of used mini slot-subchannel blocks in the process of CBR measurement. For example, still referring to FIG. 12, the partially used slot-subchannel blocks in the third slot 1202c include different numbers of used mini slot-subchannel blocks at different mini slot indexes. In particular, the partially used slot-subchannel blocks in the third slot 1202c may include 4 used mini slot-subchannel blocks at the first mini slot (i.e., mini slot index=1) within the third slot 1202c, and may include 6 used mini slot-subchannel blocks at the second mini slot (i.e., mini slot index=2) within the third slot 1202c. Accordingly, in this example, the used mini slot-subchannel blocks associated with the mini slot index that is not associated with the greater number of used mini slot-subchannel blocks may be the 4 used mini slot-subchannel blocks associated with the first mini slot (i.e., mini slot index=1) within the third slot 1202c. Therefore, the 4 used mini slot-subchannel blocks associated with the first mini slot within the third slot 1202c may be ignored in the counting of used mini slot-subchannel blocks in the process of CBR measurement. Accordingly, in this example, if the first discount factor ($\alpha 1$) is 1, the CBR may be calculated as (6 used slot-subchannel blocks in the second slot 1202b+1×6 used mini slot-subchannel blocks associated with the second mini slot in the third slot 1202c that have not been ignored)/30 slot-subchannel blocks in total in the CBR measurement window=0.4.

Figure 13:
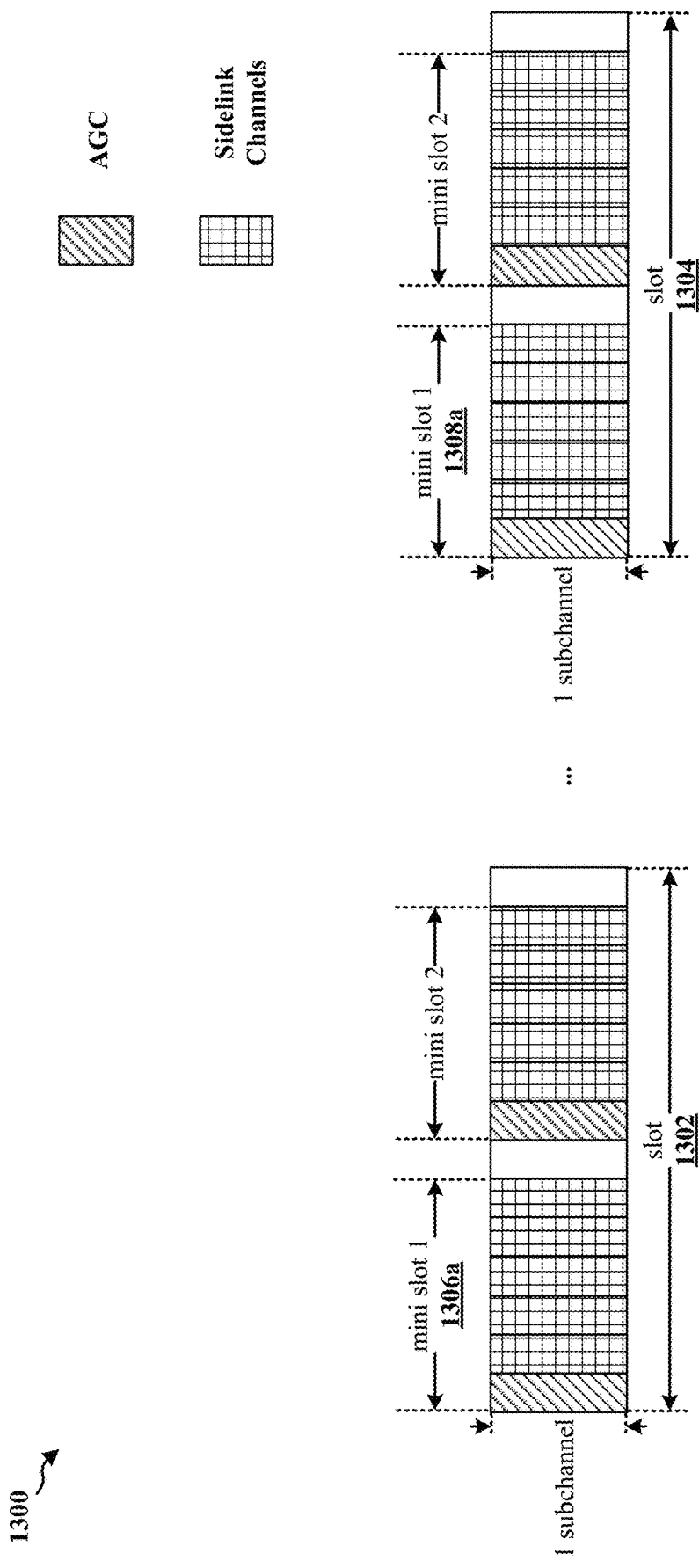
FIG. 13 is a diagram illustrating an example of mini slot CBR measurement.

FIG. 13 is a diagram 1300 illustrating an example of mini slot CBR measurement. A mini slot CBR may be calculated for a mini slot index (e.g., the i-th mini slot within a slot) for a slot based on a measurement window spanning a number of directly preceding slots. For example, the first mini slot 1306a in the slot 1302 and the first mini slot 1308a in the slot 1304 (and all the first mini slots in the slots between the slot 1302 and the slot 1304) may be associated with the same mini slot index of 1. Accordingly, if the measurement window spans from the slot 1302 to the slot 1304, inclusive, a mini slot CBR may be calculated for the mini slot index of 1 for a slot directly subsequent to the slot 1304. The mini slot CBR associated with a mini slot index and a sidelink resource pool may be defined as a fraction of the used mini slot-subchannel blocks associated with the mini slot index within the measurement window in all mini slot-subchannel blocks associated with the mini slot index within the measurement window. A same definition of a used mini slot-subchannel block as provided above may be used. In other words, a used mini slot-subchannel block may be a mini slot-subchannel block associated with an average received sidelink signal strength over all symbols configured for sidelink channels within the mini slot that is greater than the second preconfigured threshold. Accordingly, if there are m1 slots between the slot 1302 and the slot 1304, inclusive (there may accordingly be m1 mini slots associated with the mini slot index of 1), which may correspond to the measurement window, the mini slot CBR associated with the first mini slot (i.e., mini slot index=1) for the slot directly subsequent to the slot 1304 may be the ratio between the number of used mini slot-subchannel blocks that are associated with the mini slot index of 1 from the slot 1302 to the slot 1304 to m1. Therefore, in general, if there are u1 used mini slot-subchannel blocks associated with the mini slot index within the measurement window and m1 mini slot-subchannel blocks associated with the mini slot index in the measurement window, the mini slot CBR associated with the mini slot index and the sidelink resource pool may be calculated based on a formula $$\text{mini slot } CBR = \frac{u1}{m1}.$$

Herein u1 and m1 may be positive integers.

In one or more configurations, a sidelink CR evaluated by a UE for slot n may be defined as the sum of the number of slot-subchannel blocks used by the UE for its sidelink transmissions in a continuous range of past slots (e.g., a continuous range of slots [n−a, n−1], which may be the continuous range of slots from the slot n−a to the slot n−1, inclusive), and the number of slot-subchannel blocks granted to (reserved by) the UE in a continuous range of future slots (e.g., a continuous range of slots [n, n+b], which may be the continuous range of slots from the slot n to the slot n+b, inclusive), divided by the total number of slot-subchannels configured for sidelink channels in the transmission resource pool over the evaluation window, which may correspond to the same total continuous range of slots (e.g., a continuous range of slots [n−a, n+b], which may be the continuous range of slots from the slot n−a to the slot n+b, inclusive). Herein a may be a positive integer, b may be 0 or a positive integer, and a and b may be dependent on the UE implementation. In some examples, a+b+1 may be equal to 1000 or 1000·$2^\mu$ (e.g., multiples of 1000) slots. In some examples, the values of a, b, and/or µ may be based on a higher layer parameter "sl-TimeWindowSizeCR." Further, in some examples, b may be less than (a+b+1)/2, and the slot n+b may not exceed the last transmission opportunity of the grant for the current transmission.

Figure 14:
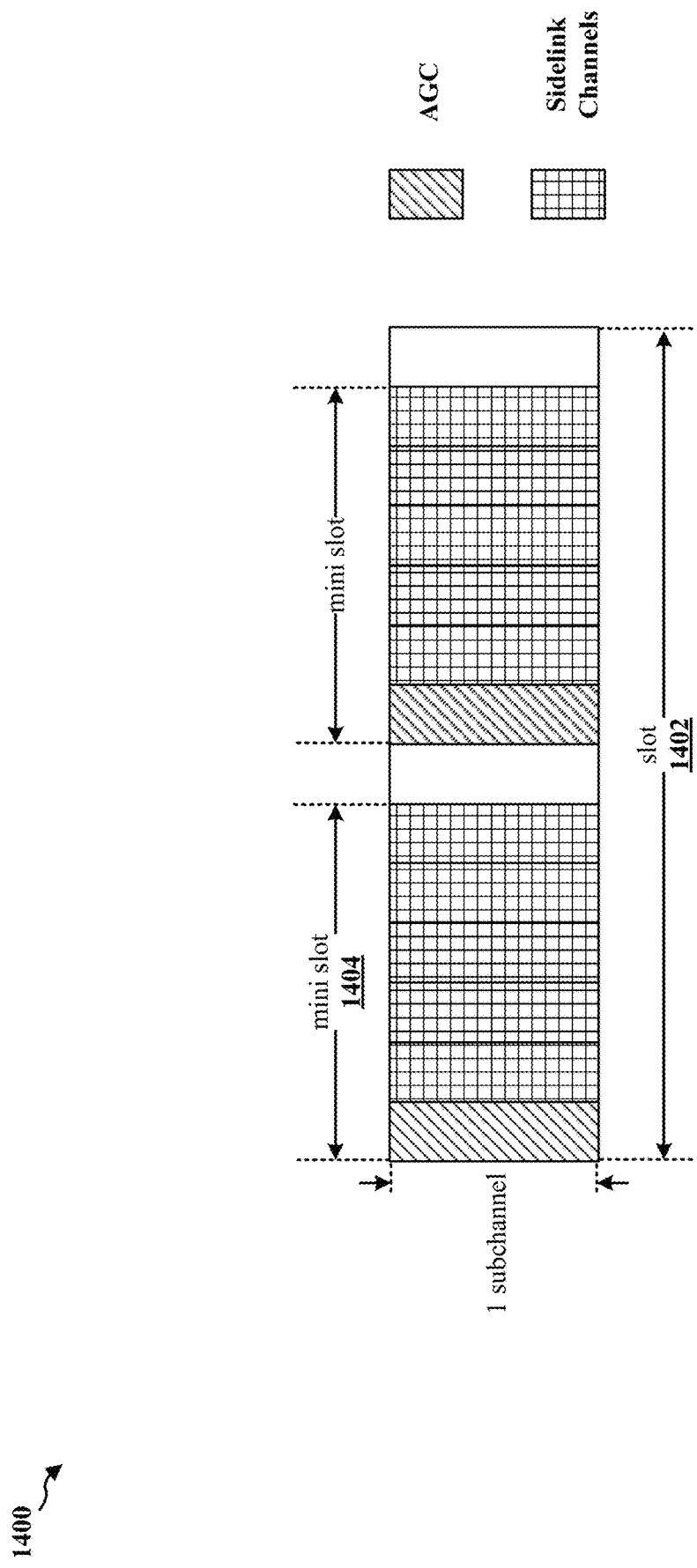
FIG. 14 is a diagram illustrating an example of a slot CR calculation where a mini slot is used.

FIG. 14 is a diagram 1400 illustrating an example of a slot CR calculation where a mini slot is used. If a UE calculating a sidelink CR has used mini slot-subchannel blocks for sidelink transmissions, or has been granted (or has reserved) mini slot-subchannel blocks within the evaluation window (e.g., the UE may have used or may have been granted (or have reserved) the mini slot-subchannel block 1404 in the slot 1402), the total number of used or granted mini slot-subchannel blocks may be added to the total number of used or granted slot-subchannel blocks in the process of sidelink CR calculation. In one or more examples, the total number of used or granted mini slot-subchannel blocks may be discounted (e.g., by a discount factor $\alpha 2$, which may be greater than 0 and equal to or less than 1) when being counted before being added to the total number of used or granted slot-subchannel blocks in the process of sidelink CR calculation. Accordingly, if 11 slot-subchannel blocks are used by or granted to the evaluating UE in the evaluation window and 12 mini slot-subchannel blocks are used by or granted to the evaluating UE in the evaluation window, and if there are n2 slot-subchannel blocks configured for sidelink channels in the evaluation window, the sidelink CR of the evaluating UE may be calculated based on a formula $$CR = \frac{l1 + \alpha 2 l2}{n2}.$$

Herein l1, l2, and n2 may be positive integers. In one or more configurations, the second discount factor ($\alpha 2$) may be prespecified or preconfigured. In one or more configurations, the second discount factor ($\alpha 2$) may be dynamically configured via RRC signaling (e.g., per sidelink resource pool) or a DCI message.

Furthermore, a mini slot CR evaluated for a UE for a mini slot associated with a mini slot index (e.g., the i-th mini slot) in a slot n may be defined as the sum of the number of mini slot-subchannel blocks associated with the mini slot index used by the UE for its sidelink transmissions in a continuous range of past slots (e.g., a continuous range of slots [n−a, n−1], which may be the continuous range of slots from the slot n−a to the slot n−1, inclusive), and the number of mini slot-subchannel blocks associated with the mini slot index granted to (reserved by) the UE in a continuous range of future slots (e.g., a continuous range of slots [n, n+b], which may be the continuous range of slots from the slot n to the slot n+b, inclusive), divided by the total number of mini slot-subchannel blocks associated with the mini slot index configured for sidelink channels in the transmission resource pool over the evaluation window, which may correspond to the same total continuous range of slots (e.g., a continuous range of slots [n−a, n+b], which may be the continuous range of slots from the slot n−a to the slot n+b, inclusive). Accordingly, if there are u2 mini slot-subchannel blocks associated with the mini slot index used by or granted to the evaluating UE in the evaluation window and m2 total mini slot-subchannel blocks associated with the mini slot index in the evaluation window, the mini slot CR associated with the mini slot index for the slot n for the UE may be calculated based on a formula $$\text{mini slot } CR = \frac{u2}{m2}.$$

Herein u2 and m2 may be positive integers.

Figure 15:
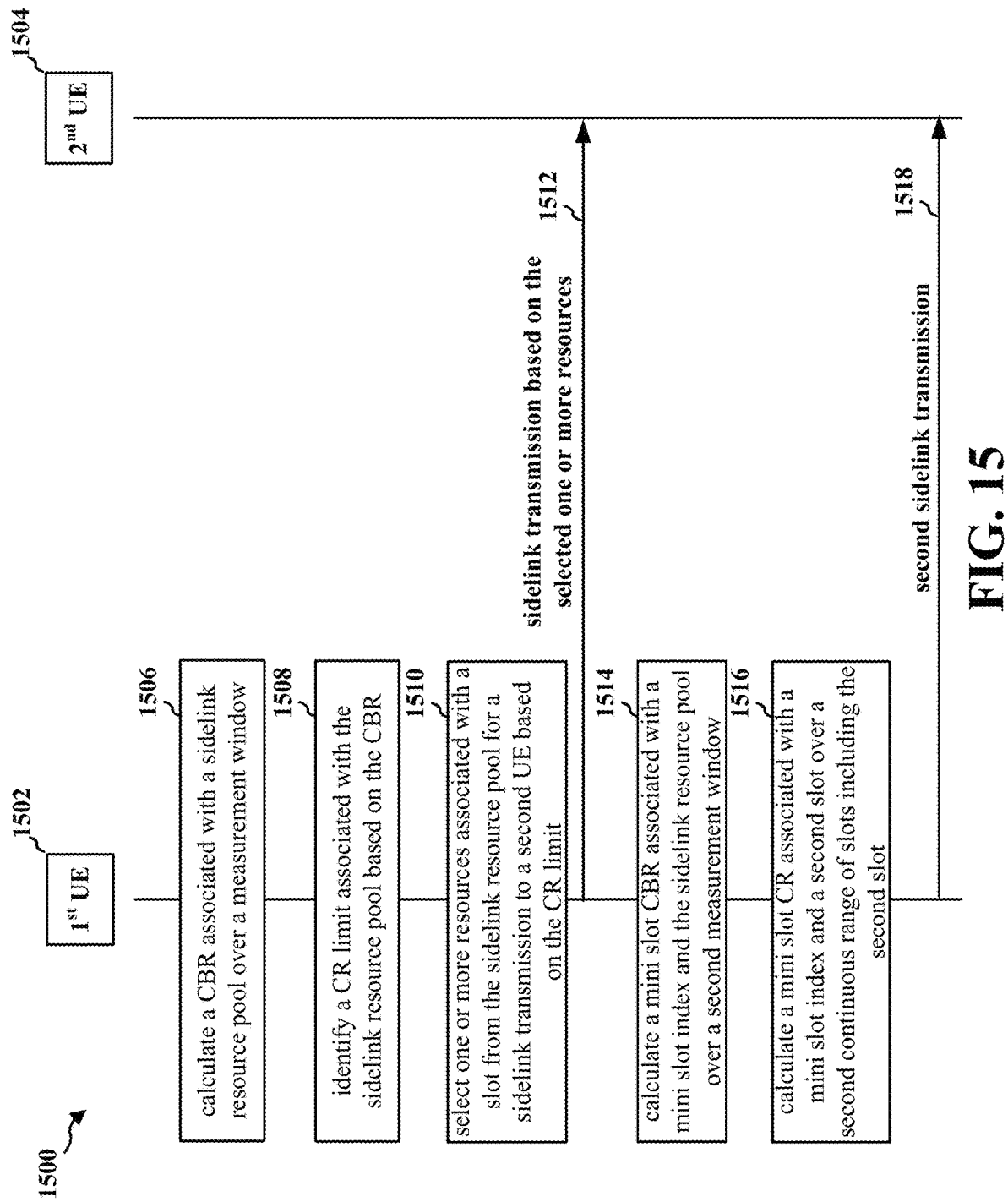
FIG. 15 is a diagram of a communication flow of a method of wireless communication.

FIG. 15 is a diagram of a communication flow 1500 of a method of wireless communication. At 1506, the first UE 1502 may calculate a CBR associated with a sidelink resource pool over a measurement window. The measurement window may correspond to a plurality of slots. A partially used slot-subchannel block in the plurality of slots may be associated with a non-zero contribution to the CBR. The partially used slot-subchannel block may include at least one used mini slot-subchannel block. An average received signal strength over the partially used slot-subchannel block may be less than a first threshold. An average received signal strength over the at least one used mini slot-subchannel block may be greater than a second threshold.

In one configuration, the CBR associated with the sidelink resource pool may be calculated based on one or more of a number (k1) of used slot-subchannel blocks within the measurement window, a number (k2) of used mini slot-subchannel blocks associated with one or more partially used slot-subchannel blocks within the measurement window, a first discount factor (α1), or a total number (n1) of slot-subchannel blocks associated with the measurement window. In particular, the CBR associated with the sidelink resource pool may be calculated based on a formula $$CBR = \frac{k1 + \alpha 1 k2}{n1}.$$

The first discount factor (α1) may be greater than 0 and less than or equal to 1.

In one configuration, an average received signal strength over each used slot-subchannel block in the number (k1) of used slot-subchannel blocks may be greater than a first threshold. An average received signal strength over each partially used slot-subchannel block in the one or more partially used slot-subchannel blocks may be less than the first threshold. An average received signal strength over each used mini slot-subchannel block in the number (k2) of used mini slot-subchannel blocks may be greater than a second threshold.

At 1508, the first UE 1502 may identify a CR limit associated with the sidelink resource pool based on the CBR.

At 1510, the first UE 1502 may select one or more resources associated with a slot from the sidelink resource pool for a sidelink transmission to a second UE 1504 based on the CR limit, such that a CR associated with the slot and calculated based at least in part on a reservation of the one or more resources may not exceed the CR limit.

In one configuration, the CR associated with the slot may be calculated based on one or more of a number (l1) of slot-subchannel blocks used by or granted to the first UE in an evaluation window corresponding to a continuous range of slots including the slot, a number (l2) of mini slot-subchannel blocks used by or granted to the first UE in the evaluation window, a second discount factor (α2), or a total number (n2) of configured slot-subchannel blocks in the evaluation window. In particular, the CR associated with the slot may be calculated based on a formula $$CR = \frac{l1 + \alpha 2 l2}{n2}.$$

The second discount factor (α2) may be greater than 0 and less than or equal to 1.

At 1512, the first UE 1502 may transmit, to the second UE 1504, the sidelink transmission based on the selected one or more resources.

At 1514, the first UE 1502 may calculate a mini slot CBR associated with a mini slot index and the sidelink resource pool over a second measurement window. The second measurement window may correspond to a second plurality of slots.

In one configuration, the mini slot CBR associated with the mini slot index and the sidelink resource pool may be calculated based on one or more of a number (u1) of used mini slot-subchannel blocks associated with the mini slot index in the measurement window or a total number (m1) of mini slot-subchannel blocks associated with the mini slot index in the measurement window. In particular, the mini slot CBR associated with the mini slot index and the sidelink resource pool may be calculated based on a formula $$\text{mini slot } CBR = \frac{u1}{m1}.$$

At 1516, the first UE 1502 may calculate a mini slot CR associated with a mini slot index and a second slot over a second evaluation window corresponding to a second continuous range of slots including the second slot.

In one configuration, the mini slot CR associated with the mini slot index and the second slot may be calculated based on one or more of a number (u2) of mini slot-subchannel blocks associated with the mini slot index used by or granted to the first UE in the second evaluation window or a total number (m2) of configured mini slot-subchannel blocks associated with the mini slot index in the second evaluation window. In particular, the mini slot CR associated with the mini slot index and the second slot is calculated based on a formula $$\text{mini slot } CR = \frac{u2}{m2}.$$

The mini slot CBR and the mini slot CR may enable the UE to perform congestion control at the mini slot granularity when mini slots associated with different mini slot indexes are associated with different congestion levels. In other words, based on the mini slot CBR and the mini slot CR, the UE may be able to transmit a sidelink transmission via a mini slot associated with a mini slot index that is associated with less congestion.

At 1518, the first UE 1502 may transmit, to the second UE 1504, a second sidelink transmission based on at least one of the mini slot CBR associated with the mini slot index or the mini slot CR associated with the mini slot index. In one or more configurations, the second sidelink transmission may be a mini slot based transmission. For example, the first UE 1502 may identify a mini slot CR limit associated with the mini slot index based on the mini slot CBR associated with the mini slot index. The first UE 1502 may select resources for the second sidelink transmission based on the mini slot CR limit associated with the mini slot index, where the resources selected for the second sidelink transmission may be associated with the same mini slot index as the calculated mini slot CBR or the calculated mini slot CR, such that the mini slot CR associated with the mini slot index may not exceed the mini slot CR limit associated with the mini slot index.

Figure 16:
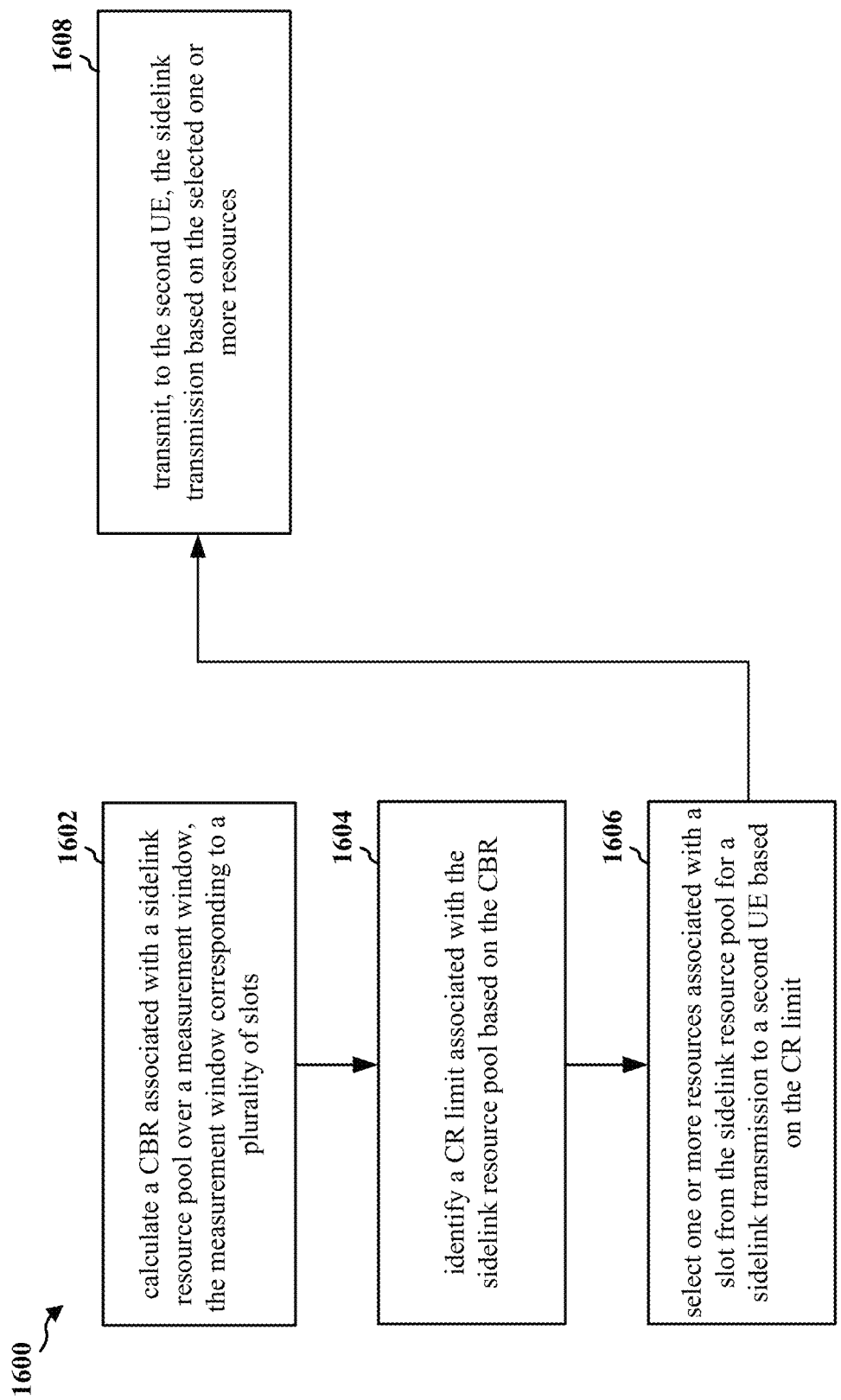
FIG. 16 is a flowchart of a method of wireless communication.

FIG. 16 is a flowchart 1600 of a method of wireless communication. The method may be performed by a first UE (e.g., the UE 104/350; the first UE 1502; the apparatus 1802). At 1602, the first UE may calculate a CBR associated with a sidelink resource pool over a measurement window. The measurement window may correspond to a plurality of slots. A partially used slot-subchannel block in the plurality of slots may be associated with a non-zero contribution to the CBR. The partially used slot-subchannel block may include at least one used mini slot-subchannel block. For example, 1602 may be performed by the CBR/CR component 1840 in FIG. 18. Referring to FIG. 15, at 1506, the first UE 1502 may calculate a CBR associated with a sidelink resource pool over a measurement window.

At 1604, the first UE may identify a CR limit associated with the sidelink resource pool based on the CBR. For example, 1604 may be performed by the CBR/CR component 1840 in FIG. 18. Referring to FIG. 15, at 1508, the first UE 1502 may identify a CR limit associated with the sidelink resource pool based on the CBR.

At 1606, the first UE may select one or more resources associated with a slot from the sidelink resource pool for a sidelink transmission to a second UE based on the CR limit. For example, 1606 may be performed by the CBR/CR component 1840 in FIG. 18. Referring to FIG. 15, at 1510, the first UE 1502 may select one or more resources associated with a slot from the sidelink resource pool for a sidelink transmission to a second UE 1504 based on the CR limit.

At 1608, the first UE may transmit, to the second UE, the sidelink transmission based on the selected one or more resources. For example, 1608 may be performed by the CBR/CR component 1840 in FIG. 18. Referring to FIG. 15, at 1512, the first UE 1502 may transmit, to the second UE 1504, the sidelink transmission based on the selected one or more resources.

Figure 17:
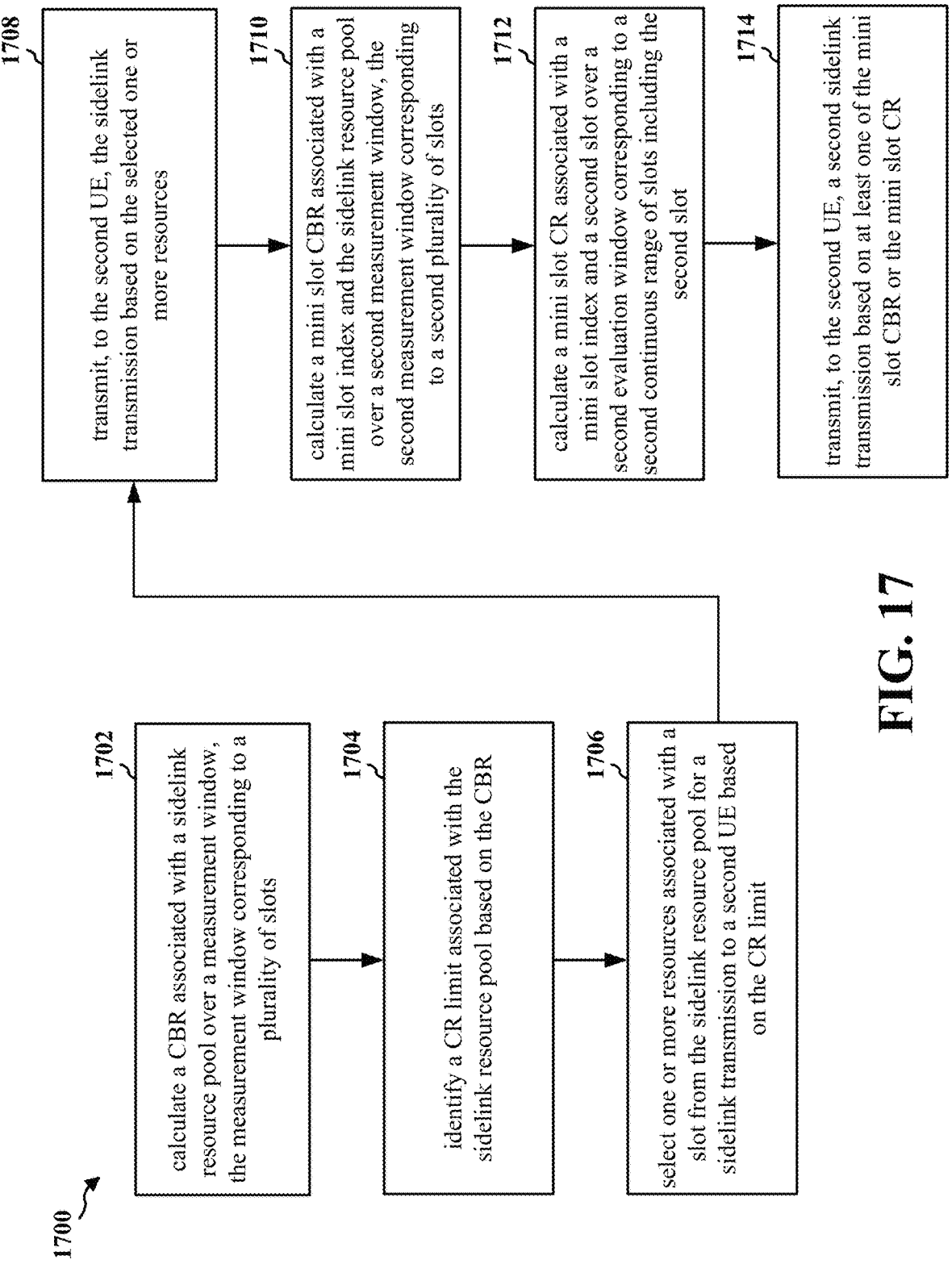
FIG. 17 is a flowchart of a method of wireless communication.

FIG. 17 is a flowchart 1700 of a method of wireless communication. The method may be performed by a first UE (e.g., the UE 104/350; the first UE 1502; the apparatus 1802). At 1702, the first UE may calculate a CBR associated with a sidelink resource pool over a measurement window. The measurement window may correspond to a plurality of slots. A partially used slot-subchannel block in the plurality of slots may be associated with a non-zero contribution to the CBR. The partially used slot-subchannel block may include at least one used mini slot-subchannel block. For example, 1702 may be performed by the CBR/CR component 1840 in FIG. 18. Referring to FIG. 15, at 1506, the first UE 1502 may calculate a CBR associated with a sidelink resource pool over a measurement window.

At 1704, the first UE may identify a CR limit associated with the sidelink resource pool based on the CBR. For example, 1704 may be performed by the CBR/CR component 1840 in FIG. 18. Referring to FIG. 15, at 1508, the first UE 1502 may identify a CR limit associated with the sidelink resource pool based on the CBR.

At 1706, the first UE may select one or more resources associated with a slot from the sidelink resource pool for a sidelink transmission to a second UE based on the CR limit. For example, 1706 may be performed by the CBR/CR component 1840 in FIG. 18. Referring to FIG. 15, at 1510, the first UE 1502 may select one or more resources associated with a slot from the sidelink resource pool for a sidelink transmission to a second UE 1504 based on the CR limit.

In one configuration, a CR associated with the slot and calculated based at least in part on a reservation of the one or more resources may not exceed the CR limit.

At 1708, the first UE may transmit, to the second UE, the sidelink transmission based on the selected one or more resources. For example, 1708 may be performed by the CBR/CR component 1840 in FIG. 18. Referring to FIG. 15, at 1512, the first UE 1502 may transmit, to the second UE 1504, the sidelink transmission based on the selected one or more resources.

In one configuration, an average received signal strength over the partially used slot-subchannel block may be less than a first threshold. An average received signal strength over the at least one used mini slot-subchannel block may be greater than a second threshold.

In one configuration, the CBR associated with the sidelink resource pool may be calculated based on one or more of a number (k1) of used slot-subchannel blocks within the measurement window, a number (k2) of used mini slot-subchannel blocks associated with one or more partially used slot-subchannel blocks within the measurement window, a first discount factor ($\alpha 1$), or a total number (n1) of slot-subchannel blocks associated with the measurement window.

In one configuration, the CBR associated with the sidelink resource pool may be calculated based on a formula $$CBR = \frac{k1 + \alpha 1 k2}{n1}.$$

The first discount factor ($\alpha 1$) may be greater than 0 and less than or equal to 1.

In one configuration, an average received signal strength over each used slot-subchannel block in the number (k1) of used slot-subchannel blocks may be greater than a first threshold. An average received signal strength over each partially used slot-subchannel block in the one or more partially used slot-subchannel blocks may be less than the first threshold. An average received signal strength over each used mini slot-subchannel block in the number (k2) of used mini slot-subchannel blocks may be greater than a second threshold.

In one configuration, the CR associated with the slot may be calculated based on one or more of a number (l1) of slot-subchannel blocks used by or granted to the first UE in an evaluation window corresponding to a continuous range of slots including the slot, a number (l2) of mini slot-subchannel blocks used by or granted to the first UE in the evaluation window, a second discount factor (α2), or a total number (n2) of configured slot-subchannel blocks in the evaluation window.

In one configuration, the CR associated with the slot may be calculated based on a formula $$CR = \frac{l1 + \alpha 2 l2}{n2}.$$

The second discount factor (α2) may be greater than 0 and less than or equal to 1.

In one configuration, at 1710, the first UE may calculate a mini slot CBR associated with a mini slot index and the sidelink resource pool over a second measurement window. The second measurement window may correspond to a second plurality of slots. For example, 1710 may be performed by the CBR/CR component 1840 in FIG. 18. Referring to FIG. 15, at 1514, the first UE 1502 may calculate a mini slot CBR associated with a mini slot index and the sidelink resource pool over a second measurement window.

In one configuration, the mini slot CBR associated with the mini slot index and the sidelink resource pool may be calculated based on one or more of a number (u1) of used mini slot-subchannel blocks associated with the mini slot index in the measurement window or a total number (m1) of mini slot-subchannel blocks associated with the mini slot index in the measurement window.

In one configuration, the mini slot CBR associated with the mini slot index and the sidelink resource pool may be calculated based on a formula mini slot $$CBR = \frac{u1}{m1}.$$

In one configuration, at 1712, the first UE may calculate a mini slot CR associated with a mini slot index and a second slot over a second evaluation window corresponding to a second continuous range of slots including the second slot. For example, 1712 may be performed by the CBR/CR component 1840 in FIG. 18. Referring to FIG. 15, at 1516, the first UE 1502 may calculate a mini slot CR associated with a mini slot index and a second slot over a second evaluation window corresponding to a second continuous range of slots including the second slot.

In one configuration, the mini slot CR associated with the mini slot index and the second slot may be calculated based on one or more of a number (u2) of mini slot-subchannel blocks associated with the mini slot index used by or granted to the first UE in the second evaluation window or a total number (m2) of configured mini slot-subchannel blocks associated with the mini slot index in the second evaluation window.

In one configuration, the mini slot CR associated with the mini slot index and the second slot may be calculated based on a formula $$\text{mini slot } CR = \frac{u2}{m2}.$$

At 1714, the first UE may transmit, to the second UE, a second sidelink transmission based on at least one of the mini slot CBR associated with the mini slot index or the mini slot CR associated with the mini slot index. For example, 1714 may be performed by the CBR/CR component 1840 in FIG. 18. Referring to FIG. 15, at 1518, the first UE 1502 may transmit, to the second UE 1504, a second sidelink transmission based on at least one of the mini slot CBR associated with the mini slot index or the mini slot CR associated with the mini slot index.

Figure 18:
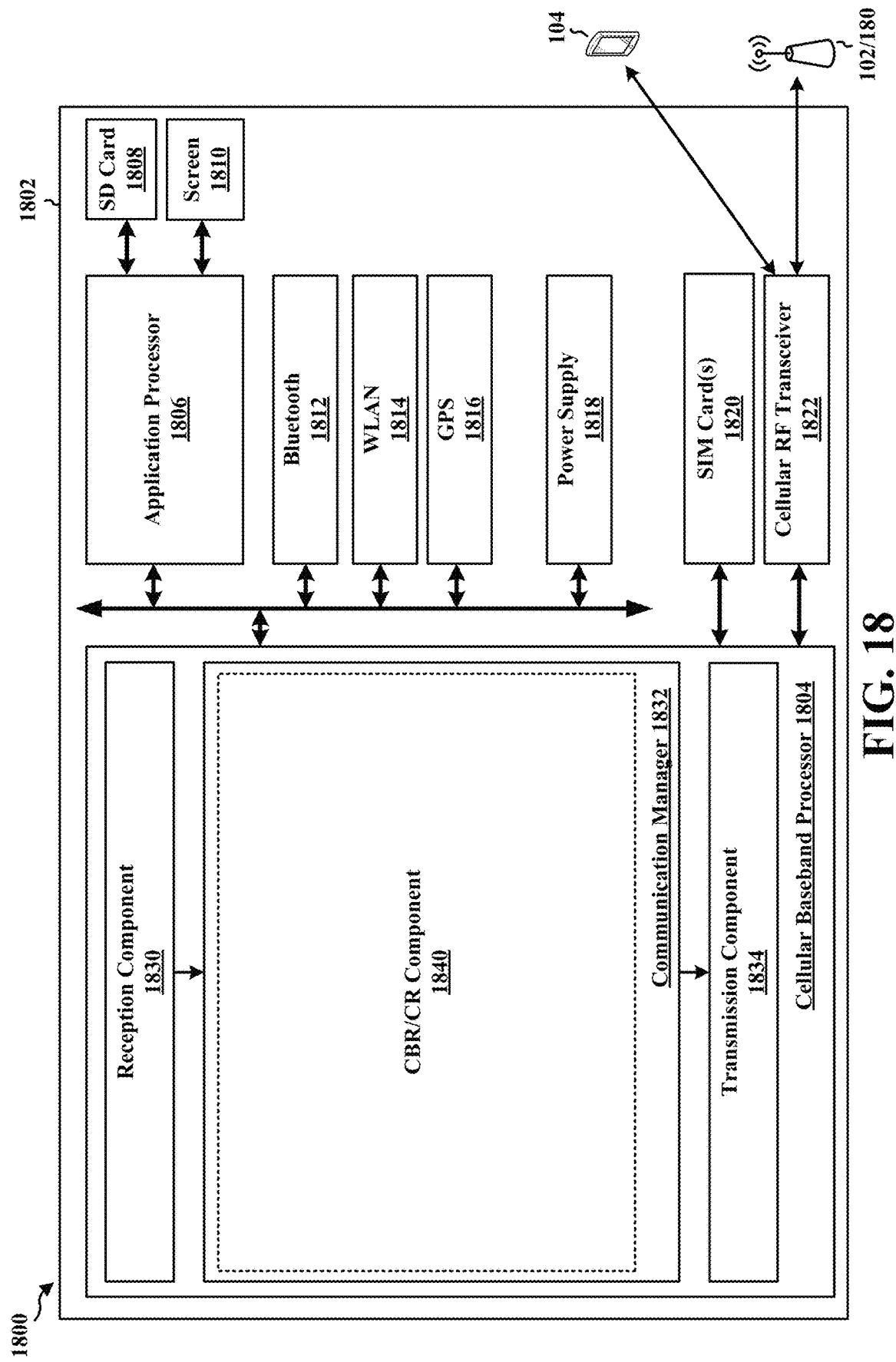
FIG. 18 is a diagram illustrating an example of a hardware implementation for an example apparatus.

FIG. 18 is a diagram 1800 illustrating an example of a hardware implementation for an apparatus 1802. The apparatus 1802 may be a UE, a component of a UE, or may implement UE functionality. In some aspects, the apparatus 1802 may include a cellular baseband processor 1804 (also referred to as a modem) coupled to a cellular RF transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a CBR/CR component 1840 that may be configured to calculate a CBR associated with a sidelink resource pool over a measurement window, e.g., as described in connection with 1602 in FIGS. 16 and 1702 in FIG. 17. The CBR/CR component 1840 may be configured to identify a CR limit associated with the sidelink resource pool based on the CBR, e.g., as described in connection with 1604 in FIGS. 16 and 1704 in FIG. 17. The CBR/CR component 1840 may be configured to select one or more resources associated with a slot from the sidelink resource pool for a sidelink transmission to a second UE based on the CR limit, e.g., as described in connection with 1606 in FIGS. 16 and 1706 in FIG. 17. The CBR/CR component 1840 may be configured to transmit, to the second UE, the sidelink transmission based on the selected one or more resources, e.g., as described in connection with 1608 in FIGS. 16 and 1708 in FIG. 17. The CBR/CR component 1840 may be configured to calculate a mini slot CBR associated with a mini slot index and the sidelink resource pool over a second measurement window, e.g., as described in connection with 1710 in FIG. 17. The CBR/CR component 1840 may be configured to calculate a mini slot CR associated with a mini slot index and a second slot over a second evaluation window corresponding to a second continuous range of slots including the second slot, e.g., as described in connection with 1712 in FIG. 17. The CBR/CR component 1840 may be configured to transmit, to the second UE, a second sidelink transmission based on at least one of the mini slot CBR associated with the mini slot index or the mini slot CR associated with the mini slot index, e.g., as described in connection with 1714 in FIG. 17.

The apparatus may include additional components that perform each of the blocks of the algorithm in the flowcharts of FIGS. 15-17. As such, each block in the flowcharts of FIGS. 15-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the cellular baseband processor 1804, includes means for calculating a CBR associated with a sidelink resource pool over a measurement window. The measurement window may correspond to a plurality of slots. A partially used slot-subchannel block in the plurality of slots may be associated with a non-zero contribution to the CBR. The partially used slot-subchannel block may include at least one used mini slot-subchannel block. The apparatus 1802, and in particular the cellular baseband processor 1804, includes means for identifying a CR limit associated with the sidelink resource pool based on the CBR. The apparatus 1802, and in particular the cellular baseband processor 1804, includes means for selecting one or more resources associated with a slot from the sidelink resource pool for a sidelink transmission to a second UE based on the CR limit. The apparatus 1802, and in particular the cellular baseband processor 1804, includes means for transmitting, to the second UE, the sidelink transmission based on the selected one or more resources.

In one configuration, an average received signal strength over the partially used slot-subchannel block may be less than a first threshold. An average received signal strength over the at least one used mini slot-subchannel block may be greater than a second threshold. In one configuration, the CBR associated with the sidelink resource pool may be calculated based on one or more of a number (k1) of used slot-subchannel blocks within the measurement window, a number (k2) of used mini slot-subchannel blocks associated with one or more partially used slot-subchannel blocks within the measurement window, a first discount factor (α1), or a total number (n1) of slot-subchannel blocks associated with the measurement window. In one configuration, the CBR associated with the sidelink resource pool may be calculated based on a formula $$CBR = \frac{k1 + \alpha 1 k2}{n1}.$$

The first discount factor (α1) may be greater than 0 and less than or equal to 1. In one configuration, an average received signal strength over each used slot-subchannel block in the number (k1) of used slot-subchannel blocks may be greater than a first threshold. An average received signal strength over each partially used slot-subchannel block in the one or more partially used slot-subchannel blocks may be less than the first threshold. An average received signal strength over each used mini slot-subchannel block in the number (k2) of used mini slot-subchannel blocks may be greater than a second threshold. In one configuration, the CR associated with the slot may be calculated based on one or more of a number (l1) of slot-subchannel blocks used by or granted to the first UE in an evaluation window corresponding to a continuous range of slots including the slot, a number (l2) of mini slot-subchannel blocks used by or granted to the first UE in the evaluation window, a second discount factor (α2), or a total number (n2) of configured slot-subchannel blocks in the evaluation window. In one configuration, the CR associated with the slot may be calculated based on a formula $$CR = \frac{l1 + \alpha 2 l2}{n2}.$$

The second discount factor (α2) may be greater than 0 and less than or equal to 1. In one configuration, the apparatus 1802, and in particular the cellular baseband processor 1804, includes means for calculating a mini slot CBR associated with a mini slot index and the sidelink resource pool over a second measurement window. The second measurement window may correspond to a second plurality of slots. In one configuration, the mini slot CBR associated with the mini slot index and the sidelink resource pool may be calculated based on one or more of a number (u1) of used mini slot-subchannel blocks associated with the mini slot index in the measurement window or a total number (m1) of mini slot-subchannel blocks associated with the mini slot index in the measurement window. In one configuration, the mini slot CBR associated with the mini slot index and the sidelink resource pool may be calculated based on a formula $$\text{mini slot } CBR = \frac{u1}{m1}.$$

In one configuration, the apparatus 1802, and in particular the cellular baseband processor 1804, includes means for calculating a mini slot CR associated with a mini slot index and a second slot over a second evaluation window corresponding to a second continuous range of slots including the second slot. In one configuration, the mini slot CR associated with the mini slot index and the second slot may be calculated based on one or more of a number (u2) of mini slot-subchannel blocks associated with the mini slot index used by or granted to the first UE in the second evaluation window or a total number (m2) of configured mini slot-subchannel blocks associated with the mini slot index in the second evaluation window. In one configuration, the mini slot CR associated with the mini slot index and the second slot may be calculated based on a formula $$\text{mini slot } CR = \frac{u2}{m2}.$$

In one configuration, a CR associated with the slot and calculated based at least in part on a reservation of the one or more resources may not exceed the CR limit.

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Referring back to FIGS. 4-18, a first UE may calculate a CBR associated with a sidelink resource pool over a measurement window. The measurement window may correspond to a plurality of slots. A partially used slot-subchannel block in the plurality of slots is associated with a non-zero contribution to the CBR. The partially used slot-subchannel block may include at least one used mini slot-subchannel block. The first UE may identify a CR limit associated with the sidelink resource pool based on the CBR. The first UE may select one or more resources associated with a slot from the sidelink resource pool for a sidelink transmission to a second UE based on the CR limit. The first UE may transmit, to the second UE, the sidelink transmission based on the selected one or more resources. Accordingly, the contribution to the CBR of a partially used slot-subchannel block may be reflected in the calculation of the CBR. The CBR may more accurately reflect the level of congestion associated with the resource pool where mini slots are utilized. The CR limit may be more appropriately set based on the CBR. The UE may also count the used or granted mini slot-subchannel blocks when calculating its CR. Therefore, the overall congestion control process may be improved and more accurate.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to calculate a CBR associated with a sidelink resource pool over a measurement window, the measurement window corresponding to a plurality of slots, a partially used slot-subchannel block in the plurality of slots being associated with a non-zero contribution to the CBR, the partially used slot-subchannel block including at least one used mini slot-subchannel block; identify a CR limit associated with the sidelink resource pool based on the CBR; select one or more resources associated with a slot from the sidelink resource pool for a sidelink transmission to a second UE based on the CR limit; and transmit, to the second UE, the sidelink transmission based on the selected one or more resources.

Aspect 2 is the apparatus of aspect 1, where an average received signal strength over the partially used slot-subchannel block is less than a first threshold, and an average received signal strength over the at least one used mini slot-subchannel block is greater than a second threshold.

Aspect 3 is the apparatus of any of aspects 1 and 2, where the CBR associated with the sidelink resource pool is calculated based on one or more of a number (k1) of used slot-subchannel blocks within the measurement window, a number (k2) of used mini slot-subchannel blocks associated with one or more partially used slot-subchannel blocks within the measurement window, a first discount factor ($\alpha 1$), or a total number (n1) of slot-subchannel blocks associated with the measurement window.

Aspect 4 is the apparatus of aspect 3, where the CBR associated with the sidelink resource pool is calculated based on a formula $$CBR = \frac{k1 + \alpha 1 k2}{n1},$$

and the first discount factor ($\alpha 1$) is greater than 0 and less than or equal to 1.

Aspect 5 is the apparatus of any of aspects 3 and 4, where an average received signal strength over each used slot-subchannel block in the number (k1) of used slot-subchannel blocks is greater than a first threshold, an average received signal strength over each partially used slot-subchannel block in the one or more partially used slot-subchannel blocks is less than the first threshold, and an average received signal strength over each used mini slot-subchannel block in the number (k2) of used mini slot-subchannel blocks is greater than a second threshold.

Aspect 6 is the apparatus of any of aspects 1 to 5, where the CR associated with the slot is calculated based on one or more of a number (l1) of slot-subchannel blocks used by or granted to the first UE in an evaluation window corresponding to a continuous range of slots including the slot, a number (l2) of mini slot-subchannel blocks used by or granted to the first UE in the evaluation window, a second discount factor (α2), or a total number (n2) of configured slot-subchannel blocks in the evaluation window.

Aspect 7 is the apparatus of aspect 6, where the CR associated with the slot is calculated based on a formula $$CR = \frac{l1 + \alpha 2 l2}{n2},$$

and the second discount factor (α2) is greater than 0 and less than or equal to 1.

Aspect 8 is the apparatus of any of aspects 1 to 7, the at least one processor being further configured to: calculate a mini slot CBR associated with a mini slot index and the sidelink resource pool over a second measurement window, the second measurement window corresponding to a second plurality of slots.

Aspect 9 is the apparatus of aspect 8, where the mini slot CBR associated with the mini slot index and the sidelink resource pool is calculated based on one or more of a number (u1) of used mini slot-subchannel blocks associated with the mini slot index in the measurement window or a total number (m1) of mini slot-subchannel blocks associated with the mini slot index in the measurement window.

Aspect 10 is the apparatus of aspect 9, where the mini slot CBR associated with the mini slot index and the sidelink resource pool is calculated based on a formula $$\text{mini slot} \, CBR = \frac{u1}{m1}.$$

Aspect 11 is the apparatus of any of aspects 1 to 10, the at least one processor being further configured to: calculate a mini slot CR associated with a mini slot index and a second slot over a second evaluation window corresponding to a second continuous range of slots including the second slot.

Aspect 12 is the apparatus of aspect 11, where the mini slot CR associated with the mini slot index and the second slot is calculated based on one or more of a number (u2) of mini slot-subchannel blocks associated with the mini slot index used by or granted to the first UE in the second evaluation window or a total number (m2) of configured mini slot-subchannel blocks associated with the mini slot index in the second evaluation window.

Aspect 13 is the apparatus of aspect 12, where the mini slot CR associated with the mini slot index and the second slot is calculated based on a formula $$\text{mini slot} \, CR = \frac{u2}{m2}.$$

Aspect 14 is the apparatus of any of aspects 1 to 13, where a CR associated with the slot and calculated based at least in part on a reservation of the one or more resources does not exceed the CR limit.

Aspect 15 is the apparatus of any of aspects 1 to 14, further including a transceiver coupled to the at least one processor.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

What is claimed is:

1. An apparatus for wireless communication at a first user equipment (UE), comprising:
  one or more memories; and
  at least one processor coupled to the one or more memories and configured to:
    calculate a channel busy ratio (CBR) associated with a sidelink resource pool over a measurement window, the measurement window corresponding to a plurality of slots, a partially used slot-subchannel block in the plurality of slots being associated with a non-zero contribution to the CBR, the partially used slot-subchannel block including at least one used mini slot-subchannel block, wherein an average received signal strength over the partially used slot-subchannel block is less than a first threshold, and an average received signal strength over the at least one used mini slot-subchannel block is greater than a second threshold;
    identify a channel occupancy ratio (CR) limit associated with the sidelink resource pool based on the CBR;
    select one or more resources associated with a slot from the sidelink resource pool for a sidelink transmission to a second UE based at least in part on the CR limit; and
    transmit, to the second UE, the sidelink transmission based on the selected one or more resources.

2. The apparatus of claim 1, wherein the CBR associated with the sidelink resource pool is calculated based on one or more of a number (k1) of used slot-subchannel blocks within the measurement window, a number (k2) of used mini slot-subchannel blocks associated with one or more partially used slot-subchannel blocks within the measurement window, a first discount factor (α1), or a total number (n1) of slot-subchannel blocks associated with the measurement window.

3. The apparatus of claim 2, wherein the CBR associated with the sidelink resource pool is calculated based on a formula $$CBR = \frac{k1 + \alpha 1 k2}{n1},$$

and the first discount factor (α1) is greater than 0 and less than or equal to 1.

4. The apparatus of claim 2, wherein an average received signal strength over each used slot-subchannel block in the number (k1) of used slot-subchannel blocks is greater than the first threshold, an average received signal strength over each partially used slot-subchannel block in the one or more partially used slot-subchannel blocks is less than the first threshold, and an average received signal strength over each used mini slot-subchannel block in the number (k2) of used mini slot-subchannel blocks is greater than the second threshold.

5. The apparatus of claim 1, wherein the CR associated with the slot is calculated based on one or more of a number (l1) of slot-subchannel blocks used by or granted to the first UE in an evaluation window corresponding to a continuous range of slots including the slot, a number (l2) of mini slot-subchannel blocks used by or granted to the first UE in the evaluation window, a second discount factor ($\alpha 2$), or a total number (n2) of configured slot-subchannel blocks in the evaluation window.

6. The apparatus of claim 5, wherein the CR associated with the slot is calculated based on a formula $$CR = \frac{l1 + \alpha 2 l2}{n2},$$

and the second discount factor ($\alpha 2$) is greater than 0 and less than or equal to 1.

7. The apparatus of claim 1, the at least one processor being further configured to:
calculate a mini slot CBR associated with a mini slot index and the sidelink resource pool over a second measurement window, the second measurement window corresponding to a second plurality of slots.

8. The apparatus of claim 7, wherein the mini slot CBR associated with the mini slot index and the sidelink resource pool is calculated based on one or more of a number (u1) of used mini slot-subchannel blocks associated with the mini slot index in the measurement window or a total number (m1) of mini slot-subchannel blocks associated with the mini slot index and the measurement window.

9. The apparatus of claim 8, wherein the mini slot CBR associated with the mini slot index and the sidelink resource pool is calculated based on a formula $$\text{mini slot} CBR = \frac{u1}{m1}.$$

10. The apparatus of claim 1, the at least one processor being further configured to:
calculate a mini slot CR associated with a mini slot index and a second slot over a second evaluation window corresponding to a second continuous range of slots including the second slot.

11. The apparatus of claim 10, wherein the mini slot CR associated with the mini slot index and the second slot is calculated based on one or more of a number (u2) of mini slot-subchannel blocks associated with the mini slot index used by or granted to the first UE in the second evaluation window or a total number (m2) of configured mini slot-subchannel blocks associated with the mini slot index in the second evaluation window.

12. The apparatus of claim 11, wherein the mini slot CR associated with the mini slot index and the second slot is calculated based on a formula $$\text{mini slot} CR = \frac{u2}{m2}.$$

13. The apparatus of claim 1, further comprising a transceiver coupled to the at least one processor, wherein a CR associated with the slot and calculated based at least in part on a reservation of the one or more resources does not exceed the CR limit.

14. A method of wireless communication at a first user equipment (UE), comprising:
calculating a channel busy ratio (CBR) associated with a sidelink resource pool over a measurement window, the measurement window corresponding to a plurality of slots, a partially used slot-subchannel block in the plurality of slots being associated with a non-zero contribution to the CBR, the partially used slot-subchannel block including at least one used mini slot-subchannel block, wherein an average received signal strength over the partially used slot-subchannel block is less than a first threshold, and an average received signal strength over the at least one used mini slot-subchannel block is greater than a second threshold;
identifying a channel occupancy ratio (CR) limit associated with the sidelink resource pool based on the CBR;
selecting one or more resources associated with a slot from the sidelink resource pool for a sidelink transmission to a second UE based at least in part on the CR limit; and
transmitting, to the second UE, the sidelink transmission based on the selected one or more resources.

15. The method of claim 14, wherein the CBR associated with the sidelink resource pool is calculated based on one or more of a number (k1) of used slot-subchannel blocks within the measurement window, a number (k2) of used mini slot-subchannel blocks associated with one or more partially used slot-subchannel blocks within the measurement window, a first discount factor ($\alpha 1$), or a total number (n1) of slot-subchannel blocks associated with the measurement window.

16. The method of claim 15, wherein the CBR associated with the sidelink resource pool is calculated based on a formula $$CBR = \frac{k1 + \alpha 1 k2}{n1},$$

and the first discount factor ($\alpha 1$) is greater than 0 and less than or equal to 1.

17. The method of claim 15, wherein an average received signal strength over each used slot-subchannel block in the number (k1) of used slot-subchannel blocks is greater than the first threshold, an average received signal strength over each partially used slot-subchannel block in the one or more partially used slot-subchannel blocks is less than the first threshold, and an average received signal strength over each used mini slot-subchannel block in the number (k2) of used mini slot-subchannel blocks is greater than the second threshold.

18. The method of claim 14, wherein the CR associated with the slot is calculated based on one or more of a number (l1) of slot-subchannel blocks used by or granted to the first UE in an evaluation window corresponding to a continuous range of slots including the slot, a number (l2) of mini slot-subchannel blocks used by or granted to the first UE in the evaluation window, a second discount factor ($\alpha 2$), or a total number (n2) of configured slot-subchannel blocks in the evaluation window.

19. The method of claim 18, wherein the CR associated with the slot is calculated based on a formula $$CR = \frac{l1 + \alpha 2 l2}{n2},$$

and the second discount factor (α2) is greater than 0 and less than or equal to 1.

20. The method of claim 14, further comprising:
calculating a mini slot CBR associated with a mini slot index and the sidelink resource pool over a second measurement window, the second measurement window corresponding to a second plurality of slots.

21. The method of claim 20, wherein the mini slot CBR associated with the mini slot index and the sidelink resource pool is calculated based on one or more of a number (u1) of used mini slot-subchannel blocks associated with the mini slot index in the measurement window or a total number (m1) of mini slot-subchannel blocks associated with the mini slot index in the measurement window.

22. The method of claim 21, wherein the mini slot CBR associated with the mini slot index and the sidelink resource pool is calculated based on a formula $$\text{mini slot } CBR = \frac{u1}{m1}.$$

23. The method of claim 14, further comprising:
calculating a mini slot CR associated with a mini slot index and a second slot over a second evaluation window corresponding to a second continuous range of slots including the second slot.

24. The method of claim 23, wherein the mini slot CR associated with the mini slot index and the second slot is calculated based on one or more of a number (u2) of mini slot-subchannel blocks associated with the mini slot index used by or granted to the first UE in the evaluation window or a total number (m2) of configured mini slot-subchannel blocks associated with the mini slot index in the second evaluation window.

25. The method of claim 24, wherein the mini slot CR associated with the mini slot index and the second slot is calculated based on a formula $$\text{mini slot } CR = \frac{u2}{m2}.$$

26. An apparatus for wireless communication at a first user equipment (UE), comprising:
means for calculating a channel busy ratio (CBR) associated with a sidelink resource pool over a measurement window, the measurement window corresponding to a plurality of slots, a partially used slot-subchannel block in the plurality of slots being associated with a non-zero contribution to the CBR, the partially used slot-subchannel block including at least one used mini slot-subchannel block, wherein an average received signal strength over the partially used slot-subchannel block is less than a first threshold, and an average received signal strength over the at least one used mini slot-subchannel block is greater than a second threshold;
means for identifying a channel occupancy ratio (CR) limit associated with the sidelink resource pool based on the CBR;
means for selecting one or more resources associated with a slot from the sidelink resource pool for a sidelink transmission to a second UE based on the CR limit; and
means for transmitting, to the second UE, the sidelink transmission based on the selected one or more resources.

27. The apparatus of claim 26, further comprising a transceiver.

28. A non-transitory computer-readable medium storing computer executable code at a first user equipment (UE), the code when executed by at least one processor causes the at least one processor to:
calculate a channel busy ratio (CBR) associated with a sidelink resource pool over a measurement window, the measurement window corresponding to a plurality of slots, a partially used slot-subchannel block in the plurality of slots being associated with a non-zero contribution to the CBR, the partially used slot-subchannel block including at least one used mini slot-subchannel block, wherein an average received signal strength over the partially used slot-subchannel block is less than a first threshold, and an average received signal strength over the at least one used mini slot-subchannel block is greater than a second threshold;
identify a channel occupancy ratio (CR) limit associated with the sidelink resource pool based on the CBR;
select one or more resources associated with a slot from the sidelink resource pool for a sidelink transmission to a second UE based on the CR limit; and
transmit, to the second UE, the sidelink transmission based on the selected one or more resources.

* * * * *